(12) United States Patent
Iriguchi et al.

(10) Patent No.: US 8,199,173 B2
(45) Date of Patent: *Jun. 12, 2012

(54) LIQUID CRYSTAL DISPLAY APPARATUS, PORTABLE DEVICE, AND DRIVE METHOD FOR LIQUID CRYSTAL DISPLAY APPARATUS

(75) Inventors: Masao Iriguchi, Tokyo (JP); Naoyasu Ikeda, Tokyo (JP); Shin-ichi Uehara, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,182

(22) Filed: Sep. 28, 2010

(65) Prior Publication Data

US 2011/0012893 A1    Jan. 20, 2011

Related U.S. Application Data

(62) Division of application No. 11/182,639, filed on Jul. 15, 2005.

(30) Foreign Application Priority Data

Jul. 15, 2004   (JP) .................. 2004-208230

(51) Int. Cl.
*H04N 13/04* (2006.01)
*H04N 9/47* (2006.01)
*G09G 5/02* (2006.01)
*G09G 3/00* (2006.01)
*G09G 3/36* (2006.01)

(52) U.S. Cl. ............... 345/695; 345/32; 345/96; 348/59
(58) Field of Classification Search .................. 345/32, 345/694; 349/15; 348/42, 58, 54
See application file for complete search history.

(56) References Cited

U.S. PATENT DOCUMENTS

| 5,850,269 | A |   | 12/1998 | Kim |
| 5,899,550 | A |   | 5/1999  | Masaki |
| 6,061,084 | A | * | 5/2000  | Perlin ............................... 345/6 |
| 6,118,584 | A | * | 9/2000  | Van Berkel et al. ......... 359/463 |

(Continued)

FOREIGN PATENT DOCUMENTS

CN     1317778 A    10/2001

(Continued)

OTHER PUBLICATIONS

Nikkei Electronics No. 838, pp. 26 to 27, issued on Jan. 6, 2003.

(Continued)

*Primary Examiner* — William Boddie
(74) *Attorney, Agent, or Firm* — Scully, Scott, Murphy & Presser, P.C.

(57) ABSTRACT

In a liquid crystal display apparatus, one display pixel has a total of six sub pixels, namely, a red sub pixel for a left eye, a green sub pixel for the left eye, a blue sub pixel for the left eye, a red sub pixel for a right eye, a green sub pixel for the right eye, and a blue sub pixel for the right eye. Those sub pixels are arranged in a square area, two in a horizontal direction along which gate lines extend, three in a vertical direction along which data lines extend. The polarity of the data lines with respect to a potential of a common electrode is inverted every time three gate lines are scanned and every frame.

12 Claims, 16 Drawing Sheets

U.S. PATENT DOCUMENTS

| | | |
|---|---|---|
| 7,471,274 B2 | 12/2008 | Kim |
| 7,705,844 B2 * | 4/2010 | Uehara et al. ............... 345/419 |
| 2001/0011981 A1 * | 8/2001 | Yamamoto et al. ........... 345/87 |
| 2001/0038370 A1 * | 11/2001 | Yeung ............................ 345/87 |
| 2005/0007302 A1 * | 1/2005 | Hattori et al. ............... 345/102 |

FOREIGN PATENT DOCUMENTS

| | | |
|---|---|---|
| CN | 100426110 C | 10/2008 |
| JP | Shou61-275823 | 12/1986 |
| JP | Shou63-068821 | 3/1988 |
| JP | Hei2-177679 | 7/1990 |
| JP | 05-002991 | 1/1993 |
| JP | Hei06-332354 | 12/1994 |
| JP | 08-248385 | 9/1996 |
| JP | 09-190162 | 7/1997 |
| JP | 09-251172 | 9/1997 |
| JP | 10-032772 | 2/1998 |
| JP | 2001-215469 | 8/2001 |
| JP | 2002-062855 | 2/2002 |
| JP | 2003-508794 | 3/2003 |
| WO | WO 00/21069 A1 | 4/2000 |
| WO | WO 2004/040354 A1 | 5/2004 |

OTHER PUBLICATIONS

Masuda, Chihiro, "A Series of Display Technologies, Three-dimensional Display" Sangyo Tosho Publishing Co., Ltd. No. 8750, 3 (1990).

* cited by examiner

FIG. 5A (PRIOR ART)

| + | + | + | + | + |
|---|---|---|---|---|
| + | + | + | + | + |
| + | + | + | + | + |
| + | + | + | + | + |
| + | + | + | + | + |

ODD FRAME

FIG. 5B (PRIOR ART)

| − | − | − | − | − |
|---|---|---|---|---|
| − | − | − | − | − |
| − | − | − | − | − |
| − | − | − | − | − |
| − | − | − | − | − |

EVEN FRAME

VERTICAL SCANNING DIRECTION

FIG. 6A (PRIOR ART)

| + | + | + | + | + |
|---|---|---|---|---|
| − | − | − | − | − |
| + | + | + | + | + |
| − | − | − | − | − |
| + | + | + | + | + |

ODD FRAME

FIG. 6B (PRIOR ART)

| − | − | − | − | − |
|---|---|---|---|---|
| + | + | + | + | + |
| − | − | − | − | − |
| + | + | + | + | + |
| − | − | − | − | − |

EVEN FRAME

VERTICAL SCANNING DIRECTION

FIG. 7A (PRIOR ART)

| + | − | + | − | + |
|---|---|---|---|---|
| − | + | − | + | − |
| + | − | + | − | + |
| − | + | − | + | − |
| + | − | + | − | + |

ODD FRAME

FIG. 7B (PRIOR ART)

| − | + | − | + | − |
|---|---|---|---|---|
| + | − | + | − | + |
| − | + | − | + | − |
| + | − | + | − | + |
| − | + | − | + | − |

EVEN FRAME

VERTICAL SCANNING DIRECTION a : b = 2 : 3

|   |   |   |   |   |
|---|---|---|---|---|
| + | + | + | + | + |
| + | + | + | + | + |
| + | + | + | + | + |
| − | − | − | − | − |
| − | − | − | − | − |
| − | − | − | − | − |
| + | + | + | + | + |

ODD FRAME

|   |   |   |   |   |
|---|---|---|---|---|
| − | − | − | − | − |
| − | − | − | − | − |
| − | − | − | − | − |
| + | + | + | + | + |
| + | + | + | + | + |
| + | + | + | + | + |
| − | − | − | − | − |

EVEN FRAME

LIQUID CRYSTAL DISPLAY APPARATUS, PORTABLE DEVICE, AND DRIVE METHOD FOR LIQUID CRYSTAL DISPLAY APPARATUS

CROSS REFERENCE TO RELATED APPLICATION

This application is a divisional of copending application Ser. No. 11/182,639 filed Jul. 15, 2005 and claims benefit of priority of Japanese Application No. 2004-208230 filed on Jul. 15, 2004, the entire contents of each of which are incorporated herein by reference.

BACKGROUND OF THE INVENTION

1. Field of the Invention

The present invention relates to a liquid crystal display apparatus in which display pixels each comprising a plurality of sub pixels are arranged in a matrix form, a portable device equipped with the liquid crystal display apparatus, and a drive method for the liquid crystal display apparatus.

2. Description of the Related Art

Display apparatuses capable of displaying a stereoscopic image have been studied. As described in Literature "Three-dimensional Display" by Chihiro Masuda, published by Sangyo Tosho Publishing Co., Ltd., for example, Euclid, a Greek mathematician, contemplated in 280 B.C. that a stereoscopy is a feeling obtained as both the right and left eyes simultaneously see different images of a same object as seen from different directions. That is, a stereoscopic image display apparatus should have the function of providing the right and left eyes with images having parallax.

As one specific way of achieving the function, multiple stereoscopic image display systems have been studied, which are classified into a type which uses glasses and a glass-less type. The type that uses glasses includes an anaglyph type which uses color differences, and a polarizing glass type which uses polarization. As a user of the glass using type cannot avoid annoyance of wearing glasses, intensive studies have recently been made on the glass-less type which does not use glasses. The glass-less type includes a lenticular lens type and a parallax barrier type.

The parallax barrier type was conceived by Berthier in 1896 and validated by Ives in 1903. As shown in FIG. 1, a parallax barrier 105 is a barrier (light-shielding plate) having multiple vertically striped thin openings or slits 105a formed. A liquid crystal display panel 106 is arranged close to one top surface of the parallax barrier 105. On the display panel 106, right-eye pixels 123 and left-eye pixels 124 are alternately arranged in a direction orthogonal to the lengthwise direction of the slits 105a. A light source 108 is arranged close to one other top surface of the parallax barrier 105, i.e., on the opposite side to the display panel 106.

Light which has been emitted from the light source 108, has passed the openings (slits 105a) of the parallax barrier 105 and has transmitted the right-eye pixels 123 becomes a light beam 181. Likewise, light which has been emitted from the light source 108, has passed the slits 105a and has transmitted the left-eye pixels 124 becomes a light beam 182. At this time, the position of an observer at which a stereoscopic image is recognizable is determined by the positional relationship between the parallax barrier 105 and the pixels. Specifically, a right eye 141 of an observer 104 should lie in a region where the entire light beam 181 corresponding to a plurality of right-eye pixels 123 passes, and a left eye 142 of the observer 104 should lie in a region where the entire light beam 182 corresponding to a plurality of left-eye pixels 124 passes. This is the case where in FIG. 1, the center, 143, of the right eye 141 and the left eye 142 of the observer is positioned in a rectangular stereoscope visible region 107 shown in FIG. 1.

Of lines that extend in the layout direction of the right-eye pixels 123 and the left-eye pixels 124 in the stereoscope visible region 107, lines which pass through an intersection 107a of diagonal lines in the stereoscope visible region 107 become the longest. With the center 143 positioned at the intersection 107a, the allowance when the position of the observer is shifted in the right-left direction becomes maximum, so that the position of the intersection 107a is the most preferable as the position of observation. In this stereoscopic image display method, therefore, the distance between the intersection 107a and the display panel 106 is taken as an optimal observation distance OD and the observer is recommended to make observation at this distance. An imaginary plane on which the distance from the display panel 106 in the stereoscope visible region 107 becomes the optimal observation distance OD is called an optimal observation plane 107b. Accordingly, lights from the right-eye pixels 123 and the left-eye pixels 124 respectively reach the right eye 141 and the left eye 142 of the observer. This allows the observer to recognize an image displayed on the display panel 106 as a stereoscopic image.

The parallax barrier type, when conceived, had the parallax barrier located between the pixels and the eyes, which brought about an annoyance and a low visibility. The recent achievement of liquid crystal display panels has made it possible to lay out the parallax barrier 105 at the back of the display panel 106 as shown in FIG. 1, thereby resulting in an improved visibility. Accordingly, intensive studies have been made on stereoscopic image display apparatuses of the parallax barrier type at present.

An example of the actual product using the parallax barrier system is described in Literature "Nikkei Electronics No. 838, pp. 26 to 27, issued on Jan. 6, 2003". The product is a mobile telephone equipped with a 3D-adapted liquid crystal display panel which constitutes a stereoscopic image display apparatus and has a size of 2.2 inches in diagonal with display dots of 176 dots horizontal×220 dots vertical. The liquid crystal display panel has a liquid crystal panel for switches that enable and disable the effect of the parallax barrier, and can change the display mode between stereoscopic display and two-dimensional display. The display definition of the apparatus in two-dimensional image display mode is 128 dpi both in the vertical direction and the horizontal direction. In stereoscopic display mode, however, the apparatus alternately displays an image for the left eye and an image for the right eye in a vertical stripe pattern as mentioned above, so that the horizontal display definition is 64, a half the vertical display definition of 128 dpi.

The lenticular lens type was invented by Ives et al. in about 1910 as described in, for example, the aforementioned Literature "Three-dimensional Display" by Chihiro Masuda, published by Sangyo Tosho Publishing Co., Ltd. FIG. 2 is a perspective view showing a lenticular lens, and FIG. 3 is an optical model diagram showing a stereoscopic image display method which uses a lenticular lens. As shown in FIG. 2, a lenticular lens 121 has one side flat, and the other side on which a plurality of barrel projections (cylindrical lenses 122) extending in one direction are formed in such a way as to be in parallel to one another in the lengthwise direction.

As shown in FIG. 3, in the stereoscopic image display apparatus of the lenticular lens type, the lenticular lens 121, the display panel 106 and the light source 108 are arranged in order from the observer's side, and the pixels of the display panel 106 are positioned at the focal plane of the lenticular lens 121. On the display panel 106, the pixels 123 for displaying an image for the right eye 141 and the pixels 124 for displaying an image for the left eye 142 are alternately arranged. A group of the adjoining pixels 123 and pixels 124 corresponds to each cylindrical lens (projecting portion) 122 of the lenticular lens 121. Accordingly, light rays from the light source 108 which have transmitted through the individual pixels are adequately directed toward the right and left eyes by the cylindrical lenses 122 of the lenticular lens 121. This allows the right and left eyes of an observer to identify different images, so that the observer can recognize a stereoscopic image.

The parallax barrier type "hides" unnecessary light rays with the barrier, whereas the lenticular lens type changes the travel direction of light rays and, in principle, the provision of the lenticular lens does not reduce the brightness of the display screen. In this respect, it seems promising to adapt the lenticular lens type particularly to portable devices or the like for which the high luminance display and low power consumption are important factors.

A developed example of the stereoscopic image display apparatus of the lenticular lens type is described in Literature "Nikkei Electronics No. 838, pp. 26 to 27, issued on Jan. 6, 2003". The liquid crystal display panel which constitutes the stereoscopic image display apparatus has a size of 7 inches in diagonal with display dots of 800 dots horizontal×480 dots vertical. The display mode can be changed between stereoscopic display and two-dimensional display by changing the distance between the lenticular lens and the liquid crystal display panel by 0.6 mm. The number of horizontal view points is five, so that five different images can be seen as the angle is changed in the horizontal direction. To display five different images, however, the horizontal resolution in stereoscopic image display mode is reduced to ⅕ of the resolution in two-dimensional image display mode.

As disclosed in Japanese Patent Publication No. Hei6-332354, for example, a multi-image simultaneous display has been developed as an image display apparatus using a lenticular lens. This display simultaneously displays images different from one another in different observation directions using the light directing function of the lenticular lens. This can allow the multi-image simultaneous display to provide a plurality of observers, positioned in different directions with respect to the display, with different images simultaneously. Japanese Patent Publication No. Hei6-332354 describes that the use of the multi-image simultaneous display can reduce the layout space and the electric charge or the like as compared with the case where displays equal in number to persons involved.

The following will describe the structure of, and drive method for the liquid crystal display panel to be installed in the above-described stereoscopic image display apparatus. FIG. 4 is a circuit diagram showing the liquid crystal display panel portion of an active matrix type liquid crystal display apparatus. As shown in FIG. 4, the liquid crystal display apparatus is provided with a liquid crystal display panel 1, and a gate line drive circuit 8 and a data line drive circuit 9 which are connected to the liquid crystal display panel 1. The liquid crystal display panel 1 comprises two substrates (not shown) provided in parallel and apart from each other, and a liquid crystal layer (not shown) provided between the two substrates. One substrate is a pixel circuit substrate, and the other one is an opposing substrate.

The pixel circuit substrate is provided with a transparent substrate of glass or the like, a plurality of gate lines 3 provided on the transparent substrate and extending in one direction (hereinafter called "horizontal direction"), and a plurality of data lines 2 provided on the transparent substrate and extending in a direction orthogonal to the extending direction (horizontal direction) of the gate lines 3 (the orthogonal direction will hereinafter be called "vertical direction"). One ends of the gate lines 3 are connected to the gate line drive circuit 8, and one ends of the data lines 2 are connected to the data line drive circuit 9. A TFT (Thin Film Transistor) 4 is provided at the closest point of each data line 2 and each gate line 3. The gate line 3 is connected to the gate of the TFT 4, the data line 2 is connected to one of the source and drain of the TFT 4, and a pixel electrode 15 is connected to the other one of the source and drain of the TFT 4.

The TFT 4 is turned on or off based on the potential of the gate line 3 to selectively connect the pixel electrode 15 to the data line 2 or set the pixel electrode 15 floating. Connected to the pixel electrode 15 is a storage capacitor 6 which holds a signal voltage during one display period. The opposing substrate is provided with a common electrode 7. A liquid crystal cell 5 is formed by the common electrode 7 of the opposing substrate, each pixel electrode of the pixel circuit substrate and that portion of the liquid crystal layer which lies therebetween.

The operation of the thus constructed liquid crystal display apparatus will be discussed below. The gate line drive circuit 8 sequentially applies a high-level signal to the gate lines 3. That is, the gate line drive circuit 8 scans a plurality of gate lines 3. Accordingly, the TFTs 4 connected to those gate lines 3 to which the high-level signal is applied are turned on at a time. In synchronism with the scanning of the gate lines 3, the data line drive circuit 9 applies a data signal to the data lines 2. As a result, the data signal is applied to the pixel electrode 15 connected to that TFT 4 which is turned on, is stored in the storage capacitor 6, and is applied in each liquid crystal cell 5. As a result, the potential of the gate line 3 connected to the TFT 4 becomes low, so that even after the TFT 4 is turned off, the pixel electrode 15 holds a given potential with respect to the common electrode 7 and a given voltage is applied to the liquid crystal cell 5. This aligns the liquid crystal of the liquid crystal cell 5 by a predetermined angle so that the light transmittance takes a predetermined value. As a result, an image can be formed by the entire liquid crystal display panel.

According to the present invention, the drive method for the liquid crystal display apparatus, generally, AC driving to invert the polarity of the voltage to be applied to the liquid crystal cells every predetermined period is carried out in order to elongate the life of the liquid crystal and ensure high reliability thereof. In other words, the inversion drive system of alternately inverting the polarity of the voltage of the data signal to be applied to the liquid crystal cells of the individual pixels from positive to negative or from negative to positive every time the data signal voltage is reapplied. The inversion drive system includes a frame inversion drive method, a gate line inversion drive method and a dot inversion drive method.

The most basic drive method is the frame inversion drive method which inverts the polarity of the voltage to be applied to the liquid crystal cells frame by frame as disclosed in, for example, Japanese Patent Publication No. Hei2-177679. The "frame" is a one vertical scan period needed to supply one screen of data signals to the entire display screen. FIGS. 5A and 5B are diagrams showing the positive/negative polarity distributions of the pixel electrode voltage when the frame inversion drive method is used. FIG. 5A shows the polarity distribution in one frame (called odd frame), and FIG. 5B shows the polarity distribution in a frame (called even frame) following the odd frame shown in FIG. 5A.

The vertical direction shown in FIGS. 5A and 5B matches with the vertical direction shown in FIG. 4 which is the scanning direction of the gate lines, while the horizontal direction shown in FIGS. 5A and 5B matches with the horizontal direction shown in FIG. 4 along which the gate lines extend. The individual cells shown in FIGS. 5A and 5B correspond to the liquid crystal cells 5 shown in FIG. 4. For the cell (liquid crystal cell) marked "+", the potential of the pixel electrode is positive (hereinafter simply called "positive polarity") with respect to the potential of the common electrode. For the cell marked "−", the potential of the pixel electrode is negative (hereinafter simply called "negative polarity") with respect to the potential of the common electrode. According to the frame inversion drive method, as shown in FIGS. 5A and 5B, when a specific pixel is driven with the positive polarity in one frame, this pixel is driven with the negative polarity in the next frame. This can ensure the elongated life and high reliability of the liquid crystal.

The frame inversion drive method however has the following problem. As shown in FIGS. 5A and 5B, when the polarities of the voltages to be applied to the liquid crystal are the same over the entire display screen in one frame, the amount of transmitting light changes frame by frame, causing flickering. In other words, the voltage to be applied to the liquid crystal is determined by the potential difference between the common electrode voltage and the pixel electrode voltage, and with a voltage having symmetrical positive and negative polarities is applied, the light transmittance in positive polarity mode becomes equal to the light transmittance in negative polarity mode. When the center level of the common electrode potential slightly shifts from the center level of the data signal potential, the positive and negative polarities of the voltage to be applied to the liquid crystal become asymmetrical, thus changing the light transmittance in positive polarity mode. When the frame frequency is 60 Hz, the variation period of the light transmittance of the liquid crystal cell becomes as low as 30 Hz or so, so that an observer recognizes it as flickering. As capacitive coupling is made between the opposing electrode and the data line or the like and the opposing electrode itself has a resistance, it is difficult to make the potential of the opposing electrode uniform over the entire screen. Even when the polarity of the opposing electrode is adjusted to the best state, the light transmittance differs between positive pixels and negative pixels.

As a solution to this problem, Japanese Patent Publication No. Shou61-275823, for example, discloses the gate line inversion drive method which inverts the polarity of the voltage to be applied to the liquid crystal cells every scan line. FIGS. 6A and 6B are diagrams showing the positive/negative polarity distributions of the pixel electrode voltage when the gate line inversion drive method is used. FIG. 6A shows the polarity distribution in an odd frame, and FIG. 6B shows the polarity distribution in an even frame. The vertical direction and the horizontal direction shown in FIGS. 6A and 6B match with the vertical direction and the horizontal shown in FIG. 4 and FIGS. 5A and 5B.

As shown in FIGS. 6A and 6B, the gate line inversion drive method inverts the polarity in each frame gate line by gate line, and further inverts the polarity of each liquid crystal cell frame by frame. Accordingly, rows of positive pixels and rows of negative pixels are alternately arranged in one screen, thereby averaging a change in light transmittance in the vertical direction, which can reduce flickering.

Japanese Patent Publication No. Shou63-68821 discloses the dot inversion drive method which inverts the polarity of the voltage to be applied to the liquid crystal for each of adjoining pixels. FIGS. 7A and 7B are diagrams showing the positive/negative polarity distributions of the pixel electrode voltage when the dot inversion drive method is used. FIG. 7A shows the polarity distribution in an odd frame, and FIG. 7B shows the polarity distribution in an even frame. The vertical direction and the horizontal direction shown in FIGS. 7A and 7B match with the vertical direction and the horizontal shown in FIG. 4, FIGS. 5A and 5B, and FIGS. 6A and 6B.

As shown in FIGS. 7A and 7B, to execute the dot inversion driving, the data signal is supplied to the pixel electrodes in such a way that its polarity differs for each of the pixels adjoining in the gate line direction, and the polarity of the data signal is inverted every horizontal period in such a way that the polarity of the pixel electrode voltage differs for each of the pixels adjoining in the data direction. Accordingly, positive pixels and negative pixels are alternately arranged in one frame both in the vertical direction and the horizontal direction, thereby averaging a change in light transmittance over the entire screen, which cancels flickering.

Of the frame inversion drive method, the gate line inversion drive method, and the dot inversion drive method, the dot inversion drive method can achieve the best image quality. However, the gate line inversion drive method and the dot inversion drive method need to invert the polarity of the data signal every time the gate line drive circuit scans a single gate line, so that the data lines and the pixel electrodes and the common electrode are charged and discharged every inversion. This undesirably increases power consumption. In this respect, Japanese Patent Publication No. 2001-215469, for example, discloses a multiple-gate-lines inversion drive method as a compromise of the frame inversion drive method and the gate line inversion drive method. This method is intended to accomplish both reduction in flickering and suppression of power consumption by inverting the polarity of the pixel electrode voltage for each of a plurality of gate lines.

The conventional technique however has the following problem. When different images are displayed with respect to a plurality of view points in the multiple-view-points image display apparatus as shown in FIGS. 1 and 3, the resolution of each image drops. For example, the resolution becomes lower in stereoscopic image mode as compared with in two-dimensional image display mode. FIG. 8 is a top view showing sub pixels of the 2-view-point parallax barrier type image display apparatus shown in FIG. 1.

As shown in FIG. 8, one display pixel in stereoscopic image mode comprises two display pixels in two-dimensional image display mode. In stereoscopic image mode, the two display pixels become a left-eye pixel for displaying an image for the left eye and a right-eye pixel for displaying an image for the right eye. Each of the left-eye pixel and the right-eye pixel comprises three primary-color sub pixels, and three slit openings correspond to one display pixel. Specifically, a left-eye red sub pixel 411 and a right-eye green sub pixel 422 correspond to the first slit opening. A left-eye blue sub pixel 413 and a right-eye red sub pixel 421 correspond to the next slit opening. A left-eye green sub pixel 412 and a right-eye blue sub pixel 423 correspond to the next slit opening. Given that the layout pitch of the primary-color sub pixels in the lengthwise direction of the slit opening (vertical direction 11) is a and the layout pitch of the primary-color sub pixels in a direction orthogonal to the slit opening (horizontal direction 12) is b, the following equation 1 is satisfied.

$$a:b = 3:1 \quad \text{(Equation 1)}$$

Accordingly, the following equation 2 is satisfied for the display pixel pitch a in stereoscopic image mode in the lengthwise direction of the slit opening and the display pixel pitch b in the direction orthogonal to the lengthwise direction of the slit opening. That is, at the time the stereoscopic image display apparatus shown in FIG. 8 displays a stereoscopic image, one display pixel has a size of a in the lengthwise direction of the slit opening and b in the direction orthogonal to the lengthwise direction.

$$a:c=1:2 \quad \text{(Equation 2)}$$

At the time the stereoscopic image display apparatus shown in FIG. 8 displays a two-dimensional image, the parallax barrier 105 is removed, and one display pixel in stereoscopic image mode is used as two display pixels. The method of removing the parallax barrier is the one disclosed in the aforementioned Literature "Nikkei Electronics No. 838, pp. 26 to 27, issued on Jan. 6, 2003" wherein the parallax barrier is constituted by the liquid crystal panel for switches and the light transmittance of each element of the liquid crystal panel is changed. When a lenticular lens is used in place of the parallax barrier, the effect of the lenticular lens can be canceled out by changing the distance between the display panel and the lenticular lens.

Specifically, in two-dimensional image display mode, the three sub pixels, namely, the left-eye red sub pixel 411, the right-eye green sub pixel 422 and the left-eye blue sub pixel 413, are used as a single display pixel, and the three sub pixels, namely, the right-eye red sub pixel 421, the left-eye green sub pixel 412 and the right-eye blue sub pixel 423, are used as a single display pixel. As a result, one display pixel has a size of a in the lengthwise direction of the slit opening and (c/2) in the direction orthogonal to the lengthwise direction. This however is nothing but doubling of the pixel pitch in the direction orthogonal to the lengthwise direction. Therefore, the resolution in the horizontal direction 12 is reduced to a half in stereoscopic image mode as compared with in two-dimensional image display mode, as per the stereoscopic image display apparatus described in the Literature "Three-dimensional Display" by Chihiro Masuda, published by Sangyo Tosho Publishing Co., Ltd.

The reduction in resolution matters particularly when a stereoscopic image containing character information is displayed and when character information is displayed stereoscopically. As the shape of the display pixels becomes a rectangular shape with the aspect ratio of 1:2, the horizontal resolution drops, so that when a character is displayed, the vertical lines which are constituting elements of the character are partly dropped off. Consequently, the visibility of character display significantly drops. This problem becomes noticeable as the number of view points increases.

According to the prior art technologies concerning the stereoscopic image display apparatus, switching between stereoscopic display and two-dimensional display is carried out over the entire screen, and it is not possible to display a mixture of a stereoscopic image and a two-dimensional image at an arbitrary position.

A similar problem, which is not inherent only to the stereoscopic image display apparatus, generally occurs in display apparatuses which display images of plural view points. That is, when different images are displayed for plural view points, the image resolution in the layout direction of the sub pixels for plural view points becomes lower as compared with the case where a single image is displayed, and the visibility considerably drops, particularly, when displaying characters.

SUMMARY OF THE INVENTION

It is an object of the present invention to provide a liquid crystal display apparatus whose resolution does not drop when displaying different images to plural view points, a portable device equipped with the liquid crystal display apparatus, and a drive method for the liquid crystal display apparatus.

A first liquid crystal display apparatus according to the present invention comprises a pixel circuit substrate, an opposing substrate provided in parallel to and apart from the pixel circuit substrate, and a liquid crystal layer provided between the pixel circuit substrate and the opposing substrate. The pixel circuit substrate includes a first substrate, gate lines provided on the first substrate and extending in a first direction, data lines provided on the first substrate and extending in a second direction intersecting the first direction, pixel electrodes respectively provided at closest points of the gate lines and the data lines, switch elements, respectively provided at the closest points, which select whether or not to connect the data lines to the pixel electrodes based on potentials of the gate lines, and a drive circuit which applies gate-line drive signals to said gate lines in order, said gate-line drive signal enabling said switch element connected to said gate line to turn on, and which outputs data signals to said data lines. The opposing substrate includes a second substrate, and a common electrode provided on the second substrate.

Each of said pixel electrodes constitutes a sub pixel. (M×N) (N and M being an integer equal to or greater than 2, respectively) sub pixels constitute a display pixel in which N sub pixels are provided consecutively in said first direction and M sub pixels are provided consecutively in said second direction. The (M×N) sub pixels of each of said display pixels are arranged in a square area. The drive circuit changes a polarity of a potential of said data signal with respect to a potential of said common electrode every time said gate-line drive signals are applied to 2 to (2×M) gate lines among said gate lines, and changes said polarity frame by frame.

According to the present invention, as (M×N) sub pixels are arranged in each display pixel, the use of the apparatus in combination with an optical member which directs light rays toward N view points can display different images to N view points. When different images are displayed to N view points, different images are displayed N sub pixels arranged in the first direction in the display pixel, and when images identical to one another are displayed to N view points, the same images are displayed N sub pixels arranged in the first direction, thereby making the resolution when displaying different images to N view points equal to the resolution when displaying the same images to N view points. Even when different images are displayed to N view points, the resolution does not drop as compared with the case where the same images are displayed to N view points. Because the number of display pixels when displaying different images to N view points is equal to the number of display pixels when displaying the same images, both images can be mixed in one screen. Further, (M×N) sub pixels constituting a display pixel are arranged in a square area, the visibility of an image is high, and is excellent, particularly, when displaying characters.

According to the present invention, as M sub pixels are arranged in the second direction in each display pixel, the number of gate lines is greater than that in the liquid crystal display apparatus which has a single sub pixel arranged in the second direction in each display pixel. Therefore, the use of the gate line inversion drive method as the drive method increases the power consumption and shortens the time of applying signal voltage per gate line, thereby occurring inadequate signal voltage charging. By way of comparison, the use of the frame inversion drive method as the drive method makes flickering likely to occur. According to the present invention, therefore, every time the drive circuit applies a gate-line drive signal to two to (2×M) gate lines, the polarity of the potential of the data signal with respect to the potential of the common electrode is changed, and the polarity is changed frame by frame. This can prevent the occurrence of flickering and suppress an increase in power consumption and the occurrence of inadequate signal voltage charging.

A second liquid crystal display apparatus according to the present invention comprises a pixel circuit substrate, an opposing substrate provided in parallel to and apart from the pixel circuit substrate, a liquid crystal layer provided between the pixel circuit substrate and the opposing substrate, and color filters.

The pixel circuit substrate includes a first substrate, gate lines provided on the first substrate and extending in a first direction, data lines provided on the first substrate and extending in a second direction intersecting the first direction, pixel electrodes respectively provided at closest points of the gate lines and the data lines, switch elements, respectively provided at the closest points, which select whether or not to connect the data lines to the pixel electrodes based on potentials of the gate lines, and a drive circuit which applies gate-line drive signals to said gate lines in order, said gate-line drive signal enabling said switch element connected to said gate line to turn on, and which outputs data signals to said data lines. The opposing substrate includes a second substrate, and a common electrode provided on the second substrate.

Each of said pixel electrodes constitutes a sub pixel. (M×N) (N and M being an integer equal to or greater than 2, respectively) sub pixels constitute a display pixel in which N sub pixels are provided consecutively in said first direction and M sub pixels are provided consecutively in said second direction. The color filters are stripe-like color filters of M colors extending in said first direction and respectively intervening in paths of light rays which pass through each of said M sub pixels arranged in said second direction. And said drive circuit changes a polarity of a potential of said data signal with respect to a potential of said common electrode every time said gate-line drive signals are applied to 2 to (2×M) gate lines among said gate lines, and changes said polarity frame by frame.

According to the present invention, as (M×N) sub pixels are arranged in each display pixel, the use of the apparatus in combination with an optical member which directs light rays toward N view points can display different images to N view points. When different images are displayed to N view points, different images are displayed N sub pixels arranged in the first direction in the display pixel, and when images identical to one another are displayed to N view points, the same images are displayed N sub pixels arranged in the first direction, thereby making the resolution when displaying different images to N view points equal to the resolution when displaying the same images to N view points. Because the number of display pixels when displaying different images to N view points is equal to the number of display pixels when displaying the same images, both images can be mixed in one screen.

According to the present invention, as M sub pixels are arranged in the second direction in each display pixel, it is possible to prevent the layout pitch of the sub pixels in the first direction from becoming significantly smaller, and prevent the aperture ratio from becoming smaller. According to the liquid crystal display apparatus of the present invention, however, the number of gate lines is greater than that in the liquid crystal display apparatus which has a single sub pixel arranged in the second direction in each display pixel. Therefore, the use of the gate line inversion drive method as the drive method increases the power consumption and shortens the time of applying signal voltage per gate line, thereby occurring inadequate signal voltage charging. By way of comparison, the use of the frame inversion drive method as the drive method makes flickering likely to occur. According to the present invention, therefore, every time the drive circuit applies a gate-line drive signal to two to (2×M) gate lines, the polarity of the data signal with respect to the common electrode is changed, and the polarity of the data signal with respect to the common electrode is changed frame by frame. This can prevent the occurrence of flickering and suppress an increase in power consumption and the occurrence of inadequate signal voltage charging.

It is preferable that the liquid crystal display apparatus should further comprise an optical member which directs light rays from an n-th (n being an integer from 1 to N) sub pixel in the N sub pixels arranged in the first direction to an n-th observation point in each of the display pixels or directs light rays externally input in such a way as to pass through the n-th sub pixel and travel toward the n-th observation point.

A third liquid crystal display apparatus according to the present invention comprises a pixel circuit substrate, an opposing substrate provided in parallel to and apart from the pixel circuit substrate, a liquid crystal layer provided between the pixel circuit substrate and the opposing substrate, and a lenticular lens which has a plurality of cylindrical lenses provided in the first direction and directs light having passed through the liquid crystal layer to different directions.

The pixel circuit substrate includes a first substrate, gate lines provided on the first substrate and extending in a first direction, data lines provided on the first substrate and extending in a second direction intersecting the first direction, pixel electrodes respectively provided at closest points of the gate lines and the data lines, switch elements, respectively provided at the closest points, which select whether or not to connect the data lines to the pixel electrodes based on potentials of the gate lines, and a drive circuit which applies gate-line drive signals to said gate lines in order, said gate-line drive signal enabling said switch element connected to said gate line to turn on, and which outputs data signals to said data lines. The opposing substrate includes a second substrate, and a common electrode provided on the second substrate.

Each of said pixel electrodes constitutes a sub pixel. (M×N) (N and M being an integer equal to or greater than 2, respectively) sub pixels constitute a display pixel in which N sub pixels are provided consecutively in said first direction and M sub pixels are provided consecutively in said second direction. The cylindrical lenses are provided in association with columns of said display pixels aligned in said second direction, given that a layout pitch of said display pixels in said first direction is P, a layout pitch of said cylindrical lenses is L, a layout pitch of said sub pixels in said first direction is b, and a layout pitch of said sub pixels in said second direction is a, (a×M):(b×N)=L:P is satisfied. And said drive circuit changes a polarity of a potential of said data signal with respect to a potential of said common electrode every time said gate-line drive signals are applied to 2 to (2×M) gate lines among said gate lines, and changes said polarity frame by frame.

According to the present invention, as (M×N) sub pixels are arranged in each display pixel and the lenticular lens is provided in such a way that each cylindrical lens corresponds to the row of display pixels, the use of the apparatus in combination with an optical member which directs light rays toward N view points can display different images to N view points. When different images are displayed to N view points, different images are displayed N sub pixels arranged in the first direction in the display pixel, and when images identical to one another are displayed to N view points, the same images are displayed N sub pixels arranged in the first direction, thereby making the resolution when displaying different images to N view points equal to the resolution when displaying the same images to N view points. Even when different images are displayed to N view points, the resolution does not drop as compared with the case where the same images are displayed to N view points. Because the number of display pixels when displaying different images to N view points is equal to the number of display pixels when displaying the same images, as both images can be mixed in one screen. Further, (M×N) sub pixels constituting a display pixel are arranged in such a way as to satisfy the equation (a×N):(b×M)=P:L, each display pixel looks like a square when an observer views the liquid crystal panel comprising the pixel circuit substrate, the liquid crystal layer and the opposing substrate through the lenticular lens. Accordingly, the visibility of an image is high, and is excellent, particularly, when displaying characters.

According to the present invention, as M sub pixels are arranged in the second direction in each display pixel, the number of gate lines is greater than that in the liquid crystal display apparatus which has a single sub pixel arranged in the second direction in each display pixel. Therefore, the use of the gate line inversion drive method as the drive method increases the power consumption and shortens the time of applying signal voltage per gate line, thereby occurring inadequate signal voltage charging. By way of comparison, the use of the frame inversion drive method as the drive method makes flickering likely to occur. According to the present invention, therefore, every time the drive circuit applies a gate-line drive signal to two to (2×M) gate lines, the polarity of the data signal with respect to the common electrode is changed, and the polarity of the data signal with respect to the common electrode is changed frame by frame. This can prevent the occurrence of flickering and suppress an increase in power consumption and the occurrence of inadequate signal voltage charging.

In the first to third liquid crystal display apparatus, in each of the display pixels, one of the N sub pixels arranged in the first direction may form an image for a left eye, and another sub pixel may form an image for a right eye, thereby displaying a stereoscopic image.

Further, it is preferable that the drive circuit should change the polarity of the data signal with respect to the common electrode every time the drive circuit applies the gate-line drive signal to M gate lines in the gate lines. Accordingly, the polarity switching pitch in the second direction becomes equal to the layout pitch of the display pixels, so that the polarity inversion periods in each hue become equal to one another. This reduces the luminance difference between frames in each hue, thus making it possible to prevent the occurrence of flickering more reliably.

It is also preferable that changing of the polarity of the data signal with respect to the common electrode should be carried out by changing both a potential of the data signal and a potential to be applied to the common electrode. This can make the fluctuation range of the potential of the data signal smaller as compared with the case where the potential of the common electrode is fixed.

A portable device according to the present invention comprises the liquid crystal display apparatus.

A first liquid crystal display apparatus drive method according to the present invention is for a liquid crystal display apparatus which has a plurality of display pixels consisted of (M×N) (N and M being an integer equal to or greater than 2, respectively) sub pixels being arranged in a square area so that said N sub pixels are arranged consecutively in a first direction along which gate lines extend and said M sub pixels are arranged consecutively in a second direction along which data lines extend, each of said sub pixels is provided for each of pixel electrodes. The first drive method has a first frame for displaying one image on the liquid crystal display apparatus, and a second frame for displaying another image with respect to the first frame by inverting the polarity. In the first and second frames, gate-line drive signals are applied to said gate lines in order, said gate-line drive signal enables said switch element connected to said gate line to turn on, data signals are output to said data lines, and a polarity of a potential of said pixel electrodes with respect to a potential of said common electrode are changed every time said gate-line drive signals are applied to 2 to (2×M) gate lines among said gate lines.

A second liquid crystal display apparatus drive method according to the present invention is for a liquid crystal display apparatus which has a plurality of display pixels consisted of (M×N) (N and M being an integer equal to or greater than 2, respectively) sub pixels so that said N sub pixels are arranged consecutively in a first direction along which gate lines extend and said M sub pixels are arranged consecutively in a second direction along which data lines extend, each of said sub pixels is provided for each of pixel electrodes, and which has stripe-like color filters of M colors provided extending in said first direction and respectively intervening in paths of light rays which pass through each of said M sub pixels arranged in said second direction. The second drive method has a first frame for displaying one image on the liquid crystal display apparatus, and a second frame for displaying another image with respect to the first frame by inverting the polarity. In the first and second frames, gate-line drive signals are applied to said gate lines in order, said gate-line drive signal enables said switch element connected to said gate line to turn on, data signals are output to said data lines, and a polarity of a potential of said pixel electrodes with respect to a potential of said common electrode are changed every time said gate-line drive signals are applied to 2 to (2×M) gate lines among said gate lines.

A third liquid crystal display apparatus drive method according to the present invention is for a liquid crystal display apparatus which has a plurality of display pixels consisted of (M×N) (N and M being an integer equal to or greater than 2, respectively) sub pixels so that said N sub pixels are arranged consecutively in a first direction along which gate lines extend and said M sub pixels are arranged consecutively in a second direction along which data lines extend, each of said sub pixels is provided for each of pixel electrodes, and which has a lenticular lens consisted of a plurality of cylindrical lenses provided in association with columns of said display pixels aligned in said second direction, given that a layout pitch of said display pixels in said first direction is P, a layout pitch of said cylindrical lenses is L, a layout pitch of said sub pixels in said first direction is b, and a layout pitch of said sub pixels in said second direction is a, (a×M):(b×N)=L:P is satisfied. The third drive method has a first frame for displaying one image on the liquid crystal display apparatus, and a second frame for displaying another image with respect to the first frame by inverting the polarity. In the first and second frames, gate-line drive signals are applied to said gate lines in order, said gate-line drive signal enables said switch element connected to said gate line to turn on, data signals are output to said data lines, and a polarity of a potential of said pixel electrodes with respect to a potential of said common electrode are changed every time said gate-line drive signals are applied to 2 to (2×M) gate lines among said gate lines.

According to the present invention, when different images are displayed to N view points, different images are displayed N sub pixels arranged in the first direction in the display pixel, and when images identical to one another are displayed to N view points, the same images are displayed N sub pixels arranged in the first direction, thereby making the resolution when displaying different images to N view points equal to the resolution when displaying the same images to N view points. Every time the drive circuit applies a gate-line drive signal to two to (2×M) gate lines, the polarity of the potential of the data signal with respect to the potential of the common electrode is changed, and the polarity is changed frame by frame. This can prevent the occurrence of flickering and suppress an increase in power consumption and the occurrence of inadequate signal voltage charging.

BRIEF DESCRIPTION OF THE DRAWINGS

FIGS. 5A and 5B are diagrams showing the positive/negative polarity distributions of a pixel electrode voltage when the frame inversion drive method is used, FIG. 5A showing the polarity distribution in an odd frame while FIG. 5B shows the polarity distribution in an even frame;

FIGS. 6A and 6B are diagrams showing the positive/negative polarity distributions of a pixel electrode voltage when the gate line inversion drive method is used, FIG. 6A showing the polarity distribution in an odd frame while FIG. 6B shows the polarity distribution in an even frame;

FIGS. 7A and 7B are diagrams showing the positive/negative polarity distributions of a pixel electrode voltage when the dot inversion drive method is used, FIG. 7A showing the polarity distribution in an odd frame while FIG. 7B shows the polarity distribution in an even frame;

FIGS. 14A and 14B are diagrams showing the positive/negative polarity distributions of a pixel electrode voltage in the present embodiment, FIG. 14A showing the polarity distribution in an odd frame while FIG. 14B shows the polarity distribution in an even frame;

DETAILED DESCRIPTION OF THE PREFERRED EMBODIMENTS

Preferred embodiments of the present invention will be described below with reference to the accompanying drawings.

(First Embodiment)

Figure 9:
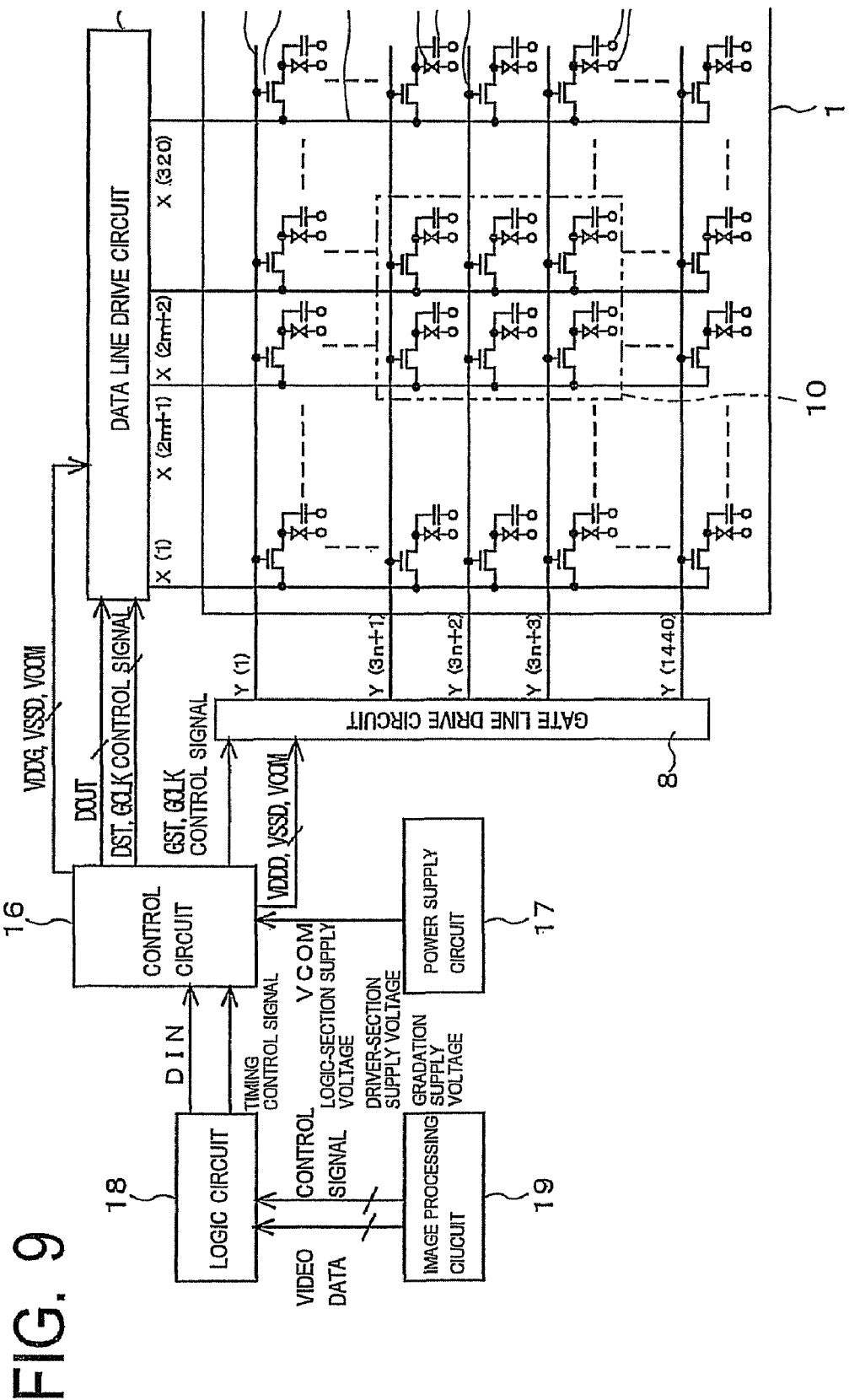
FIG. 9 is a block diagram of a liquid crystal display apparatus according to a first embodiment of the present invention.
Figure 10:
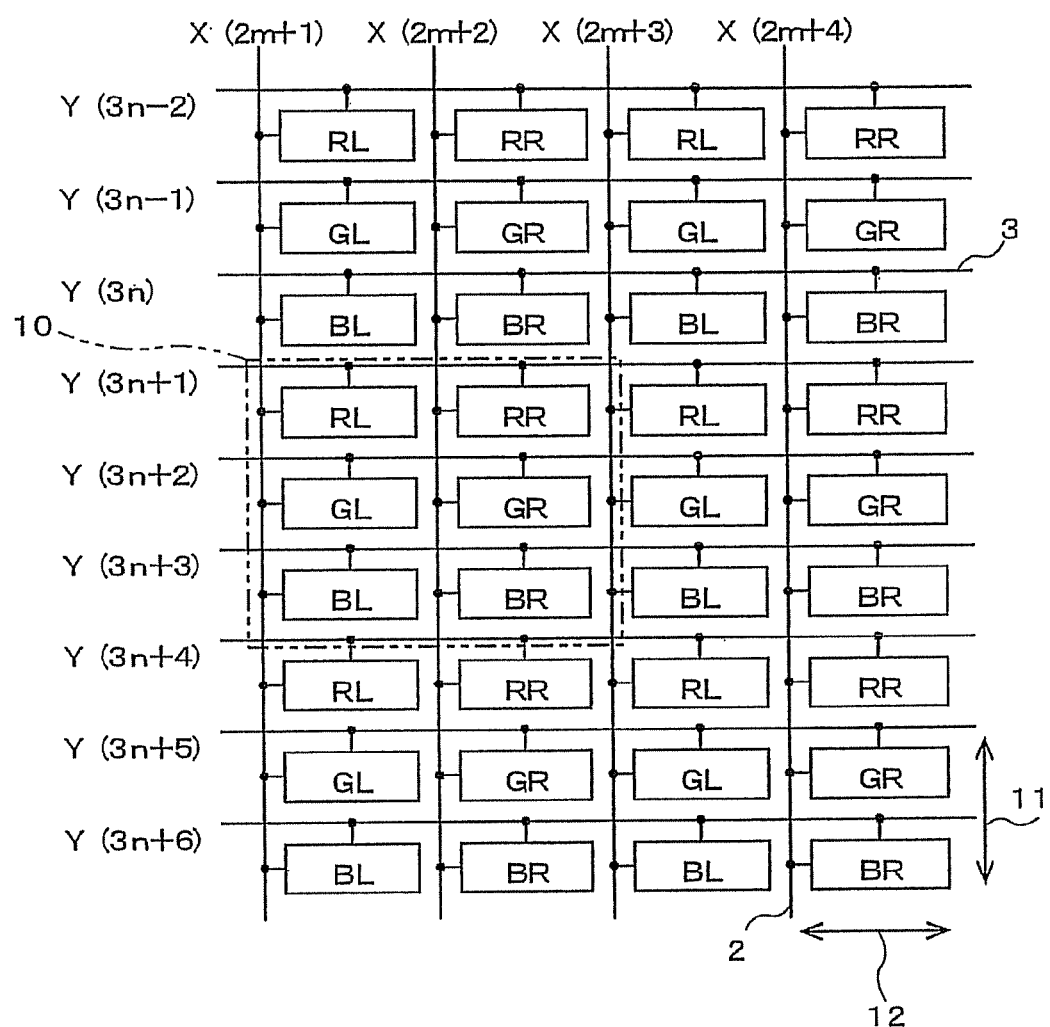
FIG. 10 is a block diagram showing the relationship between the display pixels and sub pixels of a liquid crystal panel shown in FIG. 9.
Figure 11:
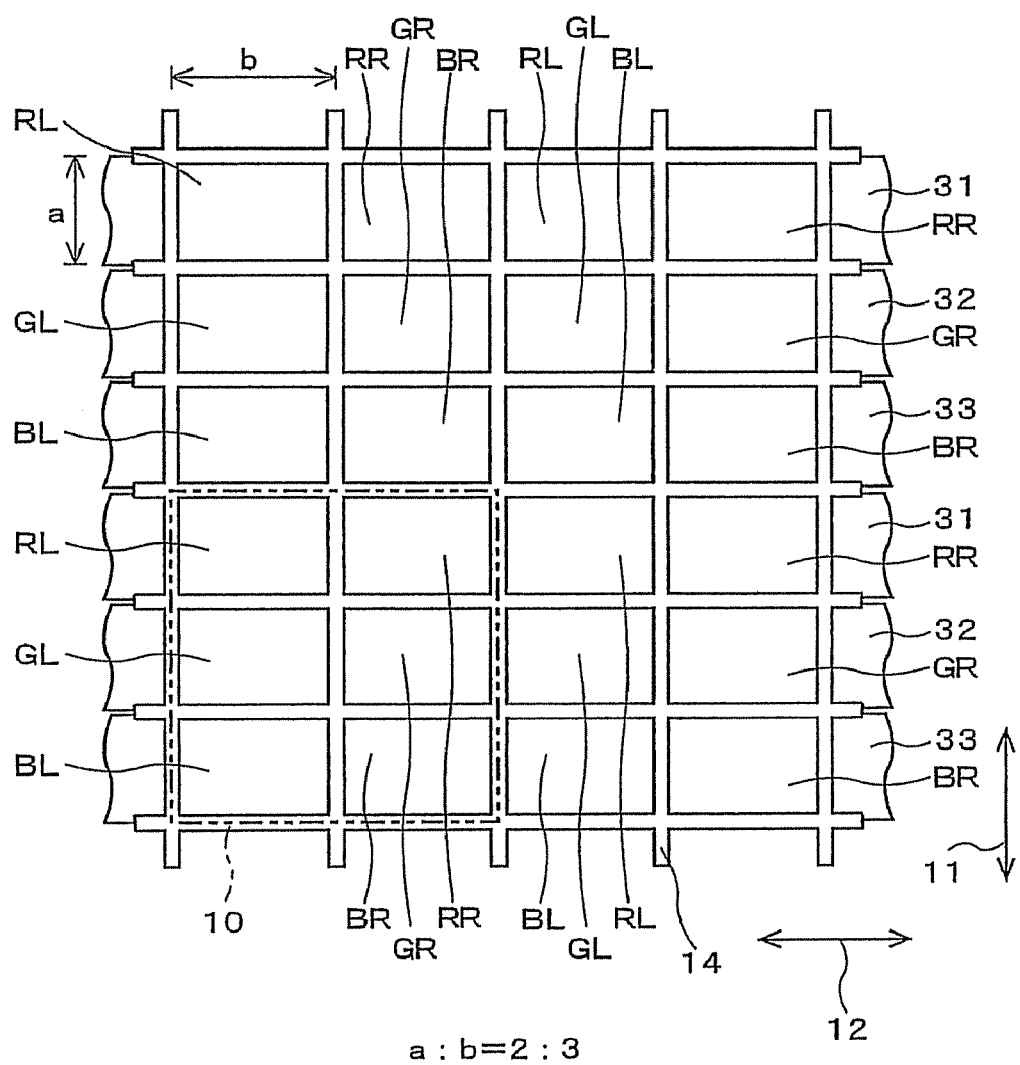
FIG. 11 is a top view showing the layout pitch of sub pixels of the liquid crystal display apparatus according to the present embodiment.
Figure 12:
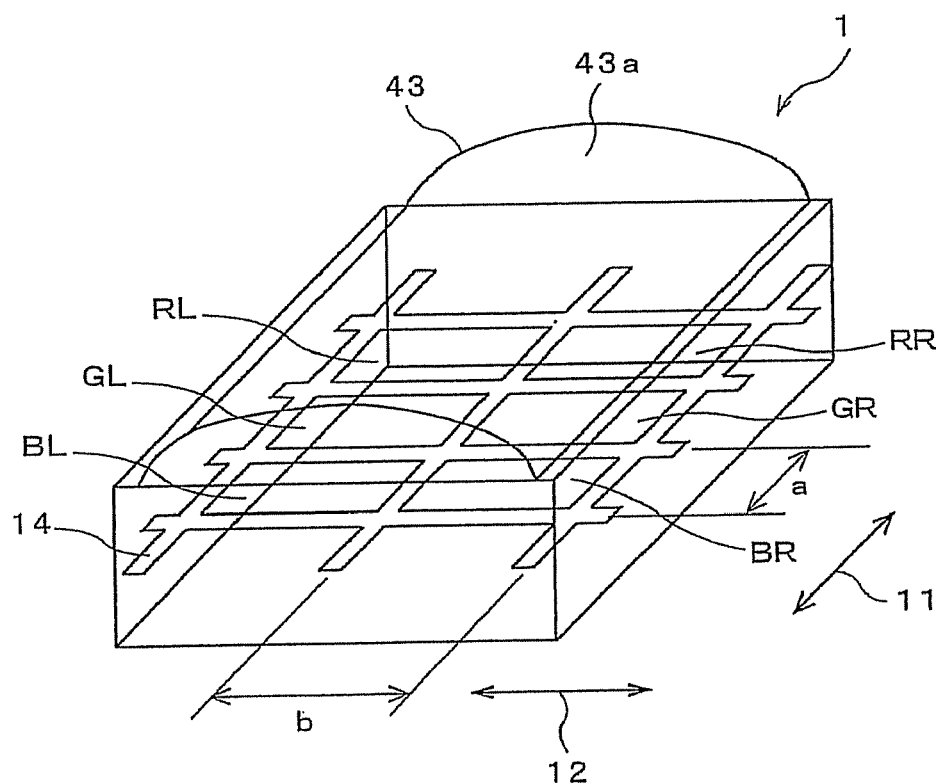
FIG. 12 is a perspective view showing an image display apparatus according to the present embodiment.

To begin with, the first embodiment of the present invention will be described. FIG. 9 is a block diagram of a liquid crystal display apparatus according to the present embodiment, FIG. 10 is a block diagram showing the relationship between the display pixels and sub pixels of a liquid crystal panel shown in FIG. 9, FIG. 11 is a top view showing the layout pitch of sub pixels of the liquid crystal display apparatus according to the present embodiment, and FIG. 12 is a perspective view showing an image display apparatus according to the present embodiment.

As shown in FIG. 9, the liquid crystal display apparatus according to the present embodiment is provided with a liquid crystal display panel 1, a gate line drive circuit 8 and a data line drive circuit 9, the latter two being connected to the liquid crystal display panel 1. A control circuit 16 is provided in such a way as to be connected to the gate line drive circuit 8 and the data line drive circuit 9. A power supply circuit 17 and a logic circuit 18 are provided in such a way as to be connected to the control circuit 16. An image processing circuit 19 is provided in such a way as to be connected to the logic circuit 18. The gate line drive circuit 8, the data line drive circuit 9 and the control circuit 16 constitute a drive circuit for the liquid crystal display panel 1.

The image processing circuit 19 includes a processor, a memory, and an interface circuit (not shown) which interfaces the inputting/outputting of signals with an external circuit. The image processing circuit 19 sends control signals, such as a synch signal, and video data to the logic circuit 18.

The logic circuit 18 generates a timing control signal for driving the liquid crystal display panel 1, and video data DIN, based on the video data and control signal input from the image processing circuit 19, and sends them to the control circuit 16. The power supply circuit 17 supplies various supply potentials to the control circuit 16.

The control circuit 16 is supplied with the video data DIN and the timing control signal from the logic circuit 18, and is supplied with a supply voltage VCOM, a logic-section supply voltage, a driver-section supply voltage, and a gradation supply voltage from the power supply circuit 17. The control circuit 16 changes the voltage levels based on the video data DIN and the timing control signal, and sends the level-changed voltages to the gate line drive circuit 8 and the data line drive circuit 9. The control circuit 16 sends a signal GST, a clock signal GCLK and other control signals to the gate line drive circuit 8, and sends a video signal DOUT, a signal DST, a clock signal DCLK and other control signals to the data line drive circuit 9.

The gate line drive circuit 8 comprises a shift register (not shown). The gate line drive circuit 8 is initialized when supplied with the signal GST representing the start point of a display frame from the control circuit 16, and applies a pulsed drive voltage to the gate lines 3 in synchronism with the clock signal GCLK supplied from the control circuit 16 to thereby sequentially drive the gate lines. At this time, the period in which the pulsed gate drive voltage turns a TFT 4 is the time for applying a data signal voltage into a liquid crystal cell 5.

The data line drive circuit 9 comprises a shift register, a latch circuit, and a driver circuit (not shown). The data line drive circuit 9 starts fetching the video signal DOUT to the shift register based on the signal DST supplied from the control circuit 16, sequentially fetches the video signal DOUT into the shift register in synchronism with the clock signal DCLK, and stops the signal fetching to the shift register when video signals for one scan line are fetched. The data line drive circuit 9 transfers the fetched video signals to the latch circuit in synchronism with the control signal supplied from the control circuit 16, and sends signal voltages corresponding to the video signals to data lines 2 via the driver circuit. The data line drive circuit 9 supplies a reference potential of two levels to a common electrode 7.

Figure 1:
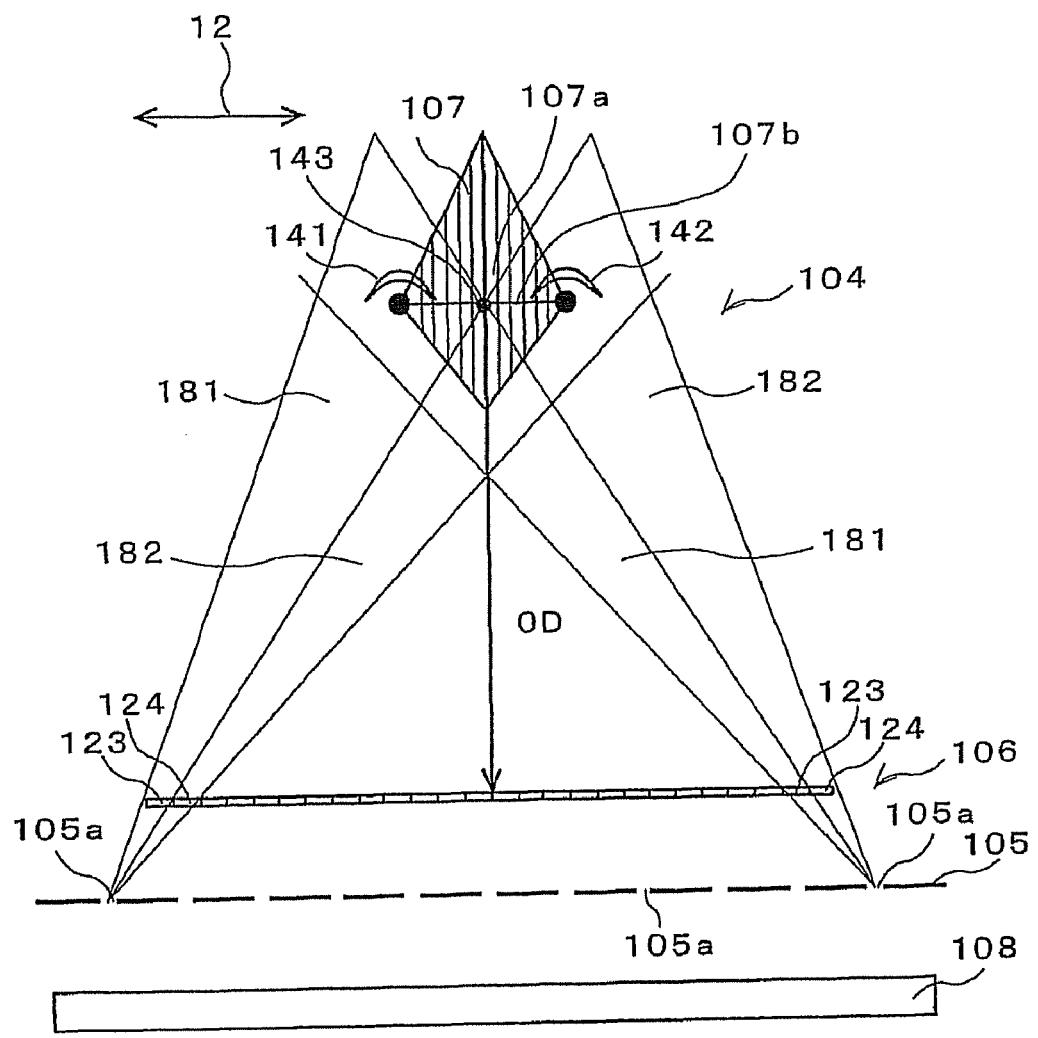
FIG. 1 is a diagram of an optical model illustrating a stereoscopic image display method using a parallax barrier.
Figure 2:
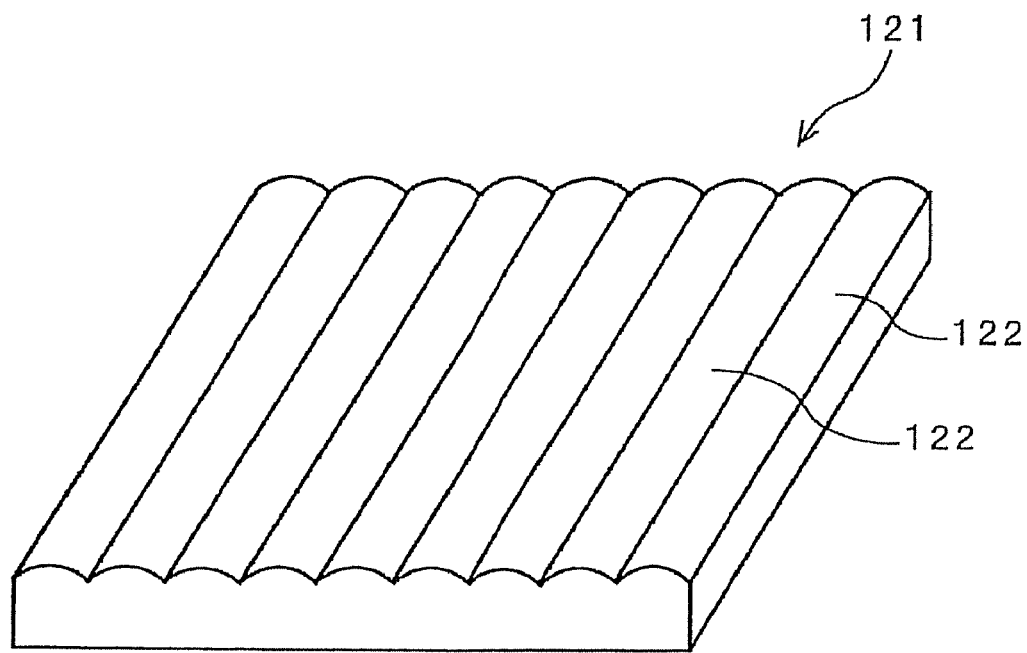
FIG. 2 is a perspective view showing a lenticular lens.
Figure 3:
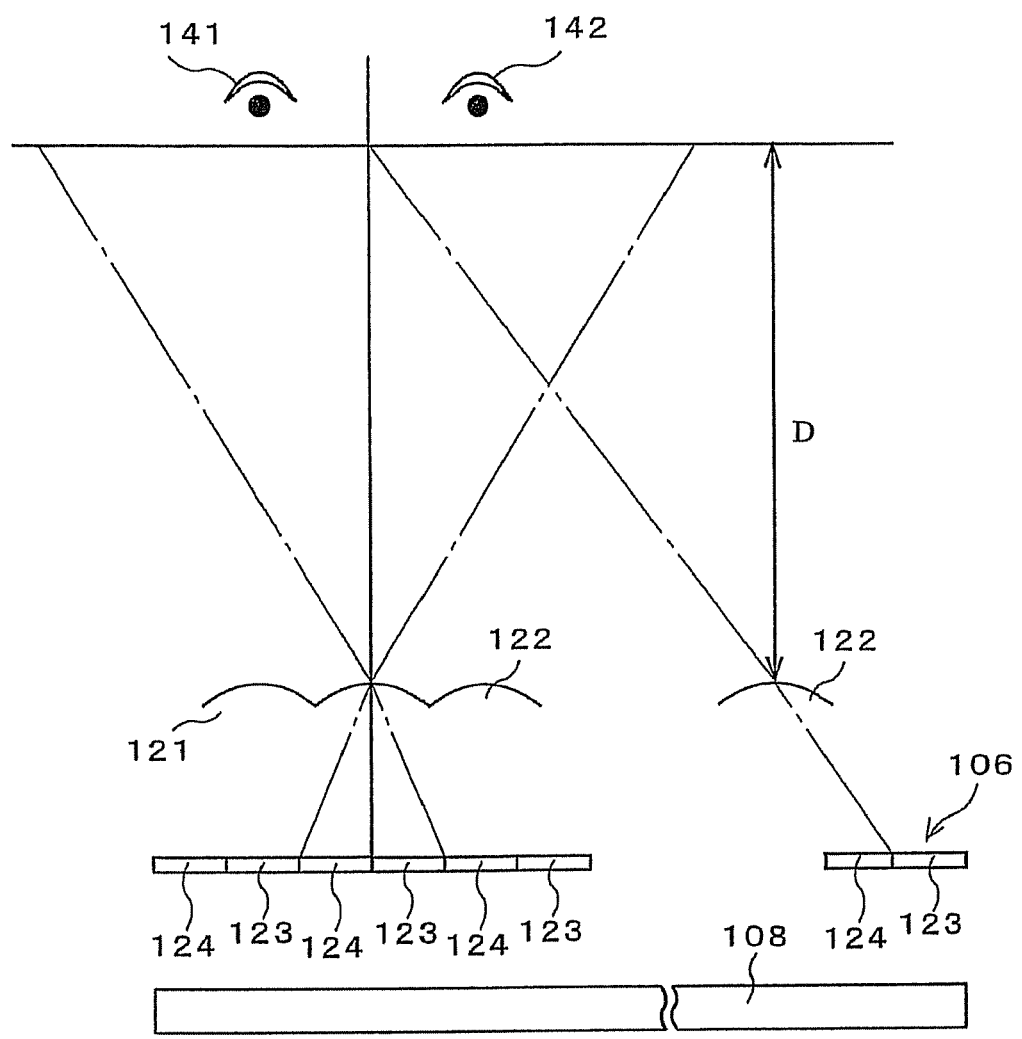
FIG. 3 is a diagram of an optical model illustrating a stereoscopic image display method using a lenticular lens.
Figure 4:
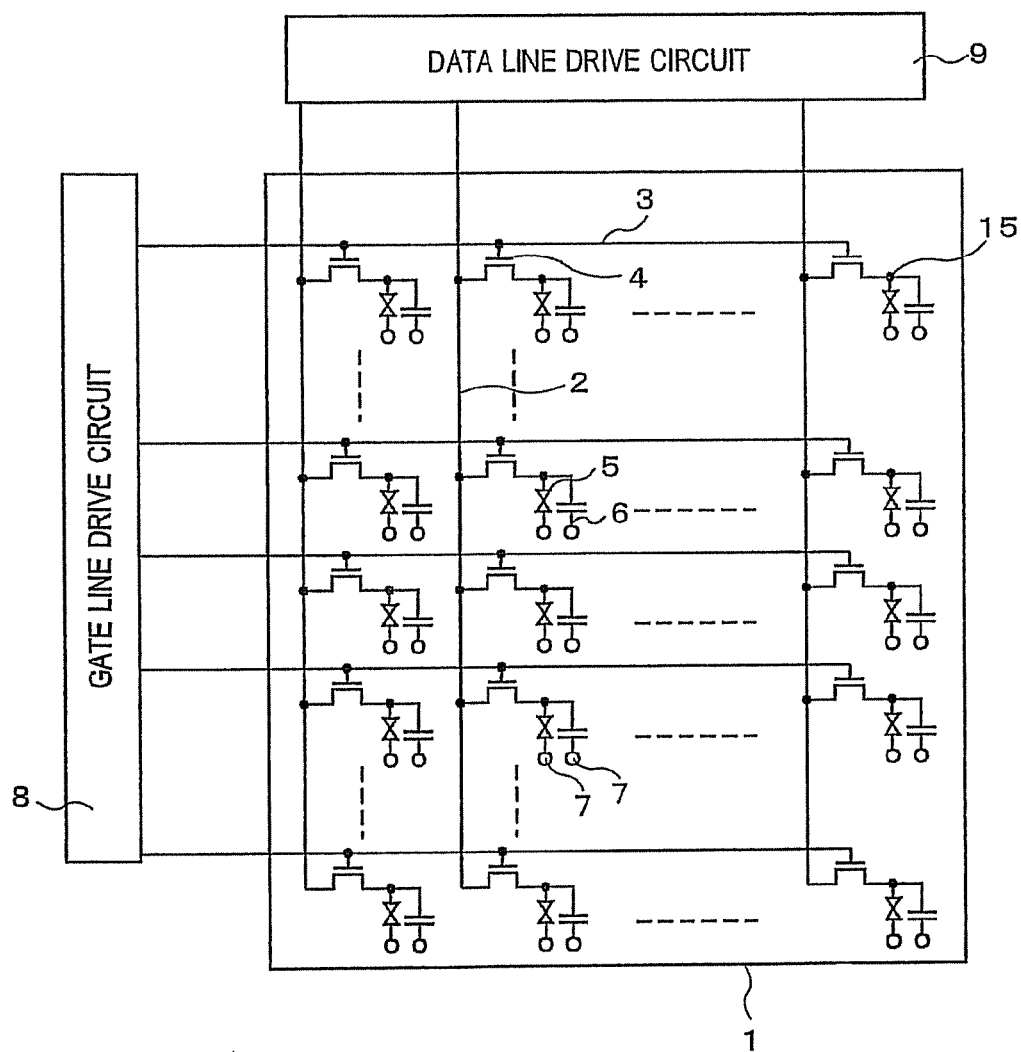
FIG. 4 is a circuit diagram showing the liquid crystal display panel portion of an active matrix type liquid crystal display apparatus.
Figure 8:
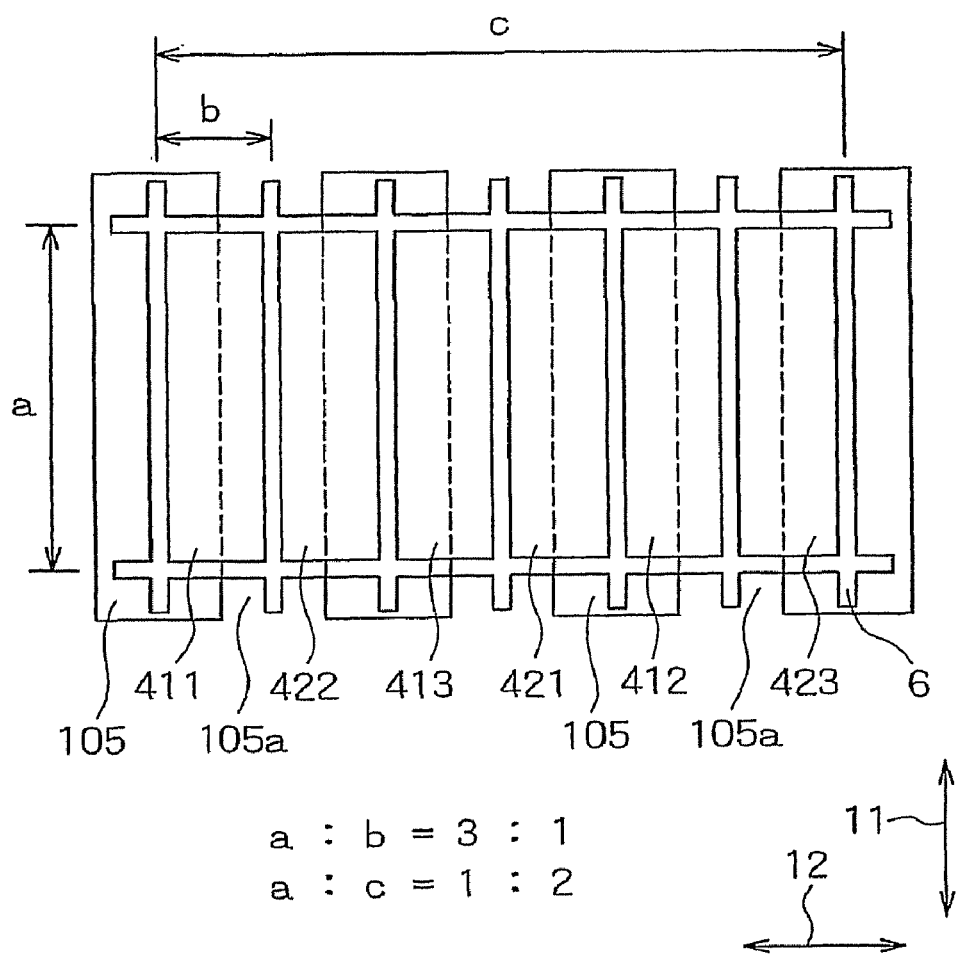
FIG. 8 is a top view showing sub pixels of the 2-view-point parallax barrier type image display apparatus shown in FIG. 1.

The following will give the detailed description of the structure of the liquid crystal display panel 1. The circuit structure of the liquid crystal display panel 1 is the same as the structure of the liquid crystal display panel 1 of the conventional liquid crystal display apparatus shown in FIG. 4. That is, as shown in FIG. 9, the liquid crystal display panel 1 is provided with a pixel circuit substrate and an opposing substrate (not shown) provided in parallel and apart from each other, and a liquid crystal layer (not shown) placed therebetween. The pixel circuit substrate is provided with a transparent substrate of glass or the like, a plurality of gate lines 3 provided on the transparent substrate and extending in the horizontal direction, and a plurality of data lines 2 provided on the transparent substrate and extending in the vertical direction. One ends of the gate lines 3 in the liquid crystal display panel 1 are connected to the gate line drive circuit 8, and one ends of the data lines 2 are connected to the data line drive circuit 9.

The TFT 4 is provided at the closest point of each data line 2 and each gate line 3. The gate line 3 is connected to the gate of the TFT 4, the data line 2 is connected to one of the source and drain of the TFT 4, and a pixel electrode 15 is connected to the other one of the source and drain of the TFT 4. The TFT 4 is turned on or off based on the potential of the gate line 3 to selectively connect the data line 2 to the pixel electrode 15 or set the pixel electrode 15 floating. Connected to the pixel electrode 15 is a storage capacitor 6 which holds a signal voltage during one display period. The opposing substrate is provided with the common electrode 7. The liquid crystal cell 5 is formed by each pixel electrode 15 of the pixel circuit substrate, that portion of the common electrode 7 of the opposing substrate which faces the pixel electrode 15, and that portion of the liquid crystal layer which lies therebetween. The liquid crystal cell 5 displays sub pixels for one dot, and constitutes a capacitor for retaining the potential of a data signal (applied signal voltage) to be supplied through the data line 2 from the data line drive circuit 9. The storage capacitor 6 adds a capacitor to hold the signal voltage to the liquid crystal cell 5, and is connected in parallel to the liquid crystal cell 5 to reduce the feed through voltage originated from the parasitic capacitor.

The resolution of the liquid crystal display panel 1 conforms to, for example, the HVGA (Half Video Graphics Array: 80 vertical×320 horizontal), the aspect ratio of the display region (the ratio of the vertical size to the horizontal size) is, for example, 3:2, and the frame frequency is, for example, 60 Hz.

As shown in FIG. 10, display pixels 10 are arranged in a matrix form on the liquid crystal display panel 1. Each display pixel 10 includes six sub pixels. Specifically, one display pixel 10 comprises a $(2m+1)$-th sub pixel and a $(2m+2)$-th sub pixel on the liquid crystal display panel 1 from the left in FIG. 10, and $(3n+1)$-th to $(3n+3)$-th sub pixels from the top. Each sub pixel corresponds to each liquid crystal cell 5 shown in FIG. 9. On the liquid crystal display panel 1, for example, the $(2m+1)$-th data line 2 from the left in the diagram is denoted by "$X(2m+1)$", and the $(3n+1)$-th gate line 3 from the top in the diagram is denoted by "$Y(3n+1)$". In the present embodiment, the there are 320 data lines 2 and 1,440 gate lines 3. Therefore, m is an integer ranging from 0 to 159, and n is an integer ranging from 0 to 479.

As shown in FIGS. 10 and 11, a red left-eye sub pixel RL, a green left-eye sub pixel GL and a blue left-eye sub pixel BL from the top in the diagrams are repeatedly provided in the $(2m+1)$-th column on the liquid crystal panel 1 from the left in the diagrams, and a red right-eye sub pixel RR, a green right-eye sub pixel GR and a blue right-eye sub pixel BR from the top in the diagrams are repeatedly provided in the $(2m+2)$-th column. That is, the red left-eye sub pixel RL and the red right-eye sub pixel RR from the left are alternately arranged in the $(3n+1)$-th row from the top in the diagrams, the green left-eye sub pixel GL and the green right-eye sub pixel GR from the left are alternately provided in the $(3n+2)$-th row, and the blue left-eye sub pixel BL and the blue right-eye sub pixel BR from the left are alternately provided in the $(3n+3)$-th row. A light-shielding section 14 is provided between sub pixels.

The sub pixels RL, GL, BL, RR, GR and BR constituting a single display pixel 10 are arranged in a square area. Given that the layout pitch of the sub pixels in the direction (vertical direction 11) along which the data lines 2 extend is a, the layout pitch of the sub pixels in the direction (horizontal direction 12) along which the gate lines 3 extend is b, the number of sub pixels arranged in one display pixel 10 in the vertical direction 11 is M, and the number of sub pixels arranged in one display pixel 10 in the horizontal direction 12 is N, a, b, M and N satisfy the following equation 3. As M=3 and N=2 in the present embodiment, the equation 3 can be rewritten as the following equation 4.

$$M \times a = N \times b \quad \text{(Equation 3)}$$

$$a:b=2:3 \quad \text{(Equation 4)}$$

The liquid crystal panel 1 is provided with a red (R) color filter 31, a green (G) color filter 32 and a blue (B) color filter 33 extending in the horizontal direction 12. Each color filter has a band-like shape.

As shown in FIG. 12, a lenticular lens 43 is provided in front of the liquid crystal panel 1, i.e., on the observer side. The lenticular lens 43 has a plurality of cylindrical lenses 43a extending in the vertical direction 11 and provided in the horizontal direction 12. Each cylindrical lens 43a corresponds to a column of display pixels 10 arranged in the vertical direction 11. A backlight (not shown) is provided at the back of the liquid crystal panel 1.

Figure 13:
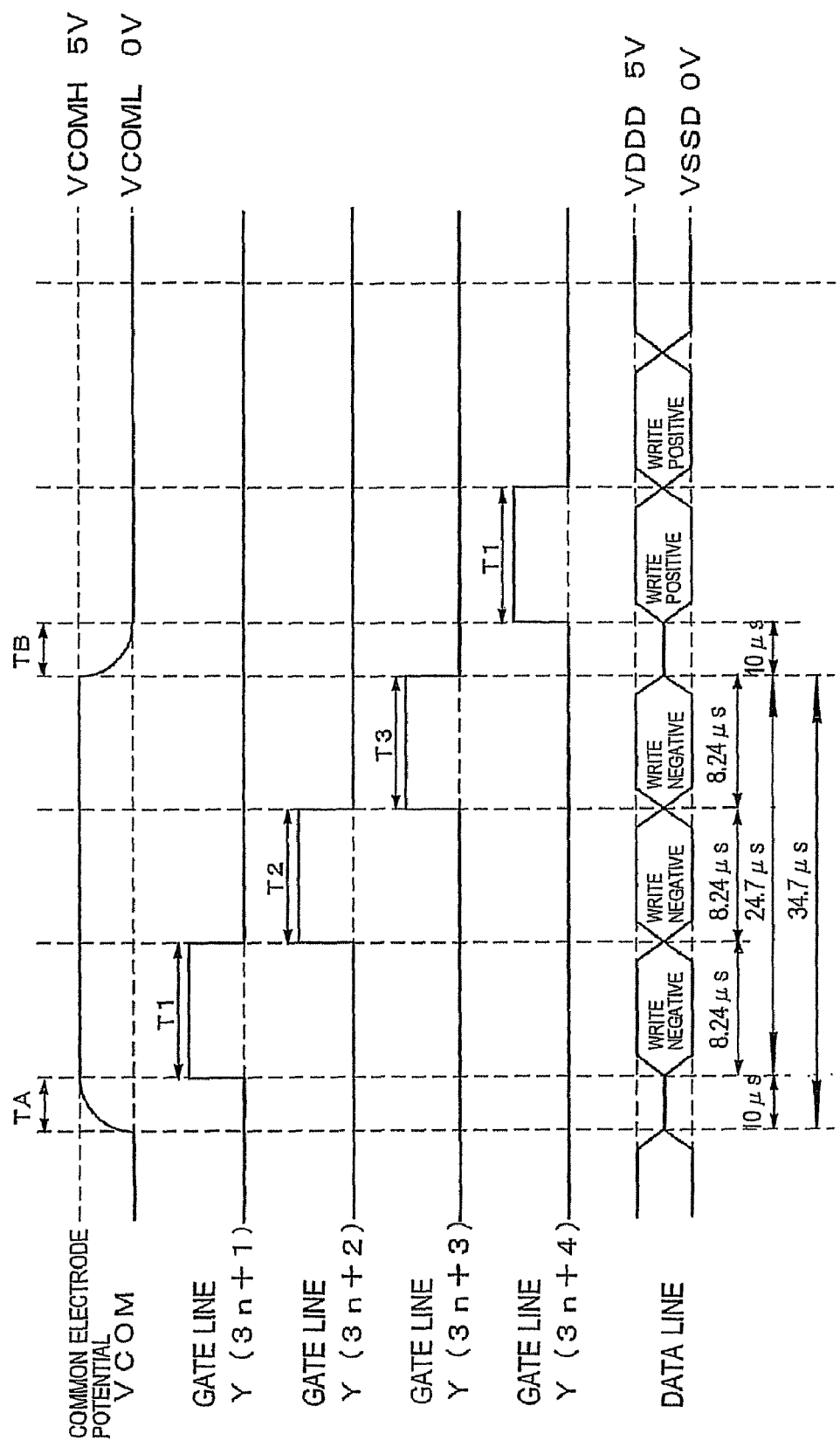
FIG. 13 is a timing chart illustrating the operation of the liquid crystal display apparatus with the time taken on the horizontal axis, and the potential VCOM of a common electrode, the potentials of gate lines Y(3$n$+1) to Y(3$n$+4) taken on the vertical axis.
Figure 14A:
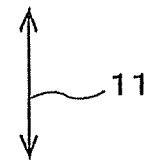
Figure 14B:
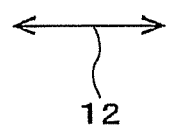

A description will now be given of the operation of the thus constructed liquid crystal display apparatus according to the present embodiment, i.e., the drive method for the liquid crystal display apparatus according to the present embodiment. FIG. 13 is a timing chart illustrating the operation of the liquid crystal display apparatus with the time taken on the horizontal axis, and the potential VCOM of the common electrode, the potentials of the gate lines $Y(3n+1)$ to $Y(3n+4)$ taken on the vertical axis. The gate lines $Y(3n+1)$ to $Y(3n+4)$ are the same as the gate lines $Y(3n+1)$ to $Y(3n+4)$ shown in FIG. 10. FIGS. 14A and 14B are diagrams showing the positive/negative polarity distributions of a pixel electrode voltage in the present embodiment, FIG. 14A showing the polarity distribution in an odd frame while FIG. 14B shows the polarity distribution in an even frame. The notation in FIGS. 14A and 14B is the same as the notation in FIGS. 5A and 5B.

First, the backlight irradiates light onto the liquid crystal panel 1. Then, the image processing circuit 19 sends video data and control signals, such as a synch signal, to the logic circuit 18. The logic circuit 18 generates the timing control signal for driving the liquid crystal display panel 1 based on the video data and the control signal, and sends the timing control signal together with video data DIN to the control circuit 16. The power supply circuit 17 supplies various supply potentials to the control circuit 16. As a result, the control circuit 16 changes the voltage levels based on the video data DIN and the timing control signal supplied from the logic circuit 18, and the supply voltage VCOM, the logic-section supply voltage, the driver-section supply voltage, and the gradation supply voltage supplied from the power supply circuit 17. The control circuit 16 sends the signal GST representing the start point of a display frame, the clock signal GCLK, supply voltages VDDG and VSSG, and the supply potential VCOM to the gate line drive circuit 8, and sends the video signal DOUT, the start signal DST, the clock signal DCLK, supply potentials VDDD and VSSD, and the supply potential VCOM to the data line drive circuit 9.

As shown in FIGS. 13 and 14A, the data line drive circuit 9 applies a polarity inversion pulse signal to the common electrode 7, and sets a high-level (VCOMH) potential to 5 V and a low-level (VCOML) potential to 0 V, the opposite polarity to the potential of a data signal. First, for example, the low-level potential, e.g., 0 V which is the same as the supply potential VSSD is applied to the common electrode 7. A potential (data signal) based on a video signal to be displayed on each liquid crystal cell 5 connected to the gate line Y(1) is applied to the data lines X(1) to X(320). At this time, the potential of the data signal is set to 0 to 5 V. When the signal GST is input, the gate line drive circuit 8 applies the high-level (VDDG) potential to the gate line Y(1). As a result, the TFTS 4 of the liquid crystal cells 5 connected to the gate line Y(1) are turned on, the data signal applied to the gate line is applied to the display pixels 15 via the TFTs 4 and is applied in the liquid crystal cells 5 and the storage capacitors 6. At this time, the polarity of the data signal to be applied to the liquid crystal cells 5 is determined with the common electrode supply potential VCOM being a reference, so that the polarity of the potential of the data signal becomes positive.

Next, the gate line drive circuit 8 sets the potential of the gate line Y(1) to a low level and sets the potential of the gate line Y(2) to a high level in synchronism with the clock signal GCLK. The data line drive circuit 9 applies each data line with the data signal based on the video signal to be displayed on the liquid crystal cells 5 connected to the gate line Y(2). As a result, the positive data signal voltage is applied in the liquid crystal cells 5 connected to the gate line Y(2). Then, the gate line drive circuit 8 sets the potential of the gate line Y(2) low and sets the potential of the gate line Y(3) to high, and the data line drive circuit 9 applies each data line with the data signal based on the video signal to be displayed on the liquid crystal cells 5 connected to the gate line Y(3). As a result, the positive data signal voltage is applied in the liquid crystal cells 5 connected to the gate line Y(3).

Next, the gate line drive circuit 8 sets the potential of the gate line Y(3) low and sets the potential of the gate line Y(4) high in synchronism with the clock signal GCLK. At this time, the data line drive circuit 9 applies the common electrode 7 with a high-level potential, e.g., 5 V which is the same as the supply potential VDDD. The data line drive circuit 9 also applies each data line with a data signal based on the video signal to be displayed on the liquid crystal cells 5 connected to the gate line Y(4). The potential of the data signal then is, for example, 5 to 0 V. As a result, the data line drive circuit 9 applies the data signal having a negative polarity with respect to the potential of the common electrode to the pixel electrodes 15 of the liquid crystal cells 5 connected to the gate line Y(4). Likewise, the data line drive circuit 9 sequentially applies data signal voltage of the negative polarity to the liquid crystal cells 5 connected to the gate lines Y(5) and Y(6).

At the time of applying data signal voltages to the liquid crystal cells 5 connected to the gate lines Y(7) to Y(9), the data line drive circuit 9 applies the potential of 0 V to the common electrode 7 again to apply the positive data signal voltages to the liquid crystal cells 5. The polarity of data signals to be applied to the liquid crystal cells 5 is changed every three gate lines this way. As the gate line drive circuit 8 sequentially applies a high-level potential to the gate line Y(1) to the gate line Y(1440) to scan the gate lines, the data line drive circuit 9 applies data signals to the liquid crystal cells 5 connected to those gate lines in synchronism with the scanning. This can allow signals to be sequentially applied to the liquid crystal cells 5 connected to the gate lines Y(1) to Y(1440). The period in which the gate line drive circuit 8 performs single scanning of the gate lines Y(1) to Y(1440) is one frame. One frame (odd frame) ends when a signal is applied to the liquid crystal cells 5 connected to the gate line Y(1440).

Next, the gate line drive circuit 8 applies a high-level signal to the gate line Y(1) again and starts scanning the gate lines Y(1) to Y(1440) As shown in FIGS. 13 and 14B. In other words, a next frame (even frame) starts. At this time, the data line drive circuit 9 applies the common electrode and each data line with a potential of the opposite polarity to the polarity for an odd frame. Accordingly, data signals of the negative polarity are applied to the liquid crystal cells 5 connected to the gate lines Y(1) to Y(3), and data signals of the positive polarity are applied to the liquid crystal cells 5 connected to the gate lines Y(4) to Y(6). The same is true of the other gate lines. The polarity of data signals to be supplied to the liquid crystal cells 5 is inverted this way. That is, when data signals of the negative polarity to the common electrode potential VCOM are applied to the display pixels that are selected by the gate lines Y(3$n$+1), Y(3$n$+2) and Y(3$n$+3) in an x-th frame (x being a natural number), data signals of the positive polarity to the common electrode potential VCOM are applied to the display pixels that are selected by the gate lines Y(3$n$+1), Y(3$n$+2) and Y(3$n$+3) in an (x+1)-th frame.

As shown in FIG. 13, a period T1 where the gate line Y(3$n$+1) is selected, a period T2 where the gate line Y(3$n$+2) is selected, and a period T3 where the gate line Y(3$n$+3) is selected are valid periods to apply data signal voltages to the liquid crystal cells 5 connected to those gate lines, while a rise period TA and a fall period TB for the common electrode potential VCOM to perform polarity inversion every three horizontal periods are invalid periods where no data signals are applied to the liquid crystal cells 5. As the frame frequency is 60 Hz in the present embodiment, the display period for one screen is 16.7 ms (milliseconds), and as the resolution of the liquid crystal panel 1 is HVGA and the total number of the gate lines is 1440, one horizontal period is 11.6 μs (microseconds). As the inversion period of the common electrode potential VCOM is comprised of three horizontal periods, it becomes 34.7 μs. Given that the rise period TA and the fall period TB for the common electrode potential VCOM to become stable are 10 μs, for example, 10 μs is in the three horizontal periods is the invalid period and 24.7 μs is the valid period to apply data signals to pixels for three gate lines.

It is desirable that the select period T1 for the gate line Y(3*n*+1), the select period T2 for the gate line Y(3*n*+2) and the select period T3 for the gate line Y(3*n*+3) to apply data signal voltages to the sub pixels of individual colors of red, green and blue should all be identical in order to eliminate the difference in time of applying voltages between the sub pixels of the individual colors. According to the present embodiment, therefore, the valid period to apply data signals to pixels for one gate line is 8.24 μs.

As data signal voltages of 0 to 5 V are applied to all the liquid crystal cells 5 of the liquid crystal panel 1 in each frame in the above-described manner, the transmittance of light which transmits the liquid crystal cells 5 according to the voltage changes. Accordingly, some of light rays emitted from the backlight are blocked by the liquid crystal cells 5, and the remaining rays transmit the liquid crystal cells 5. The light rays that have transmitted the liquid crystal cells 5 transmit the color filters 31 to 33 to be colored, and are directed in the horizontal direction by the lenticular lens 43. As an observer shifts the right eye and the left eye to adequate positions, the light rays that have transmitted left-eye sub pixels 21 to 23 reach the left eye of the observer while the light rays that have transmitted right-eye sub pixels 24 to 26 reach the right eye of the observer.

When images having a parallax are displayed on the left-eye sub pixels and the right-eye sub pixels, the observer can recognize a stereoscopic image. That is, the liquid crystal display apparatus can display a stereoscopic image. When same information is displayed on the left-eye sub pixels and the right-eye sub pixels, a two-dimensional image can be displayed. At this time, the resolution of the image is the same as that in stereoscopic image mode, and the shape of the display pixels becomes a square.

Figure 15:
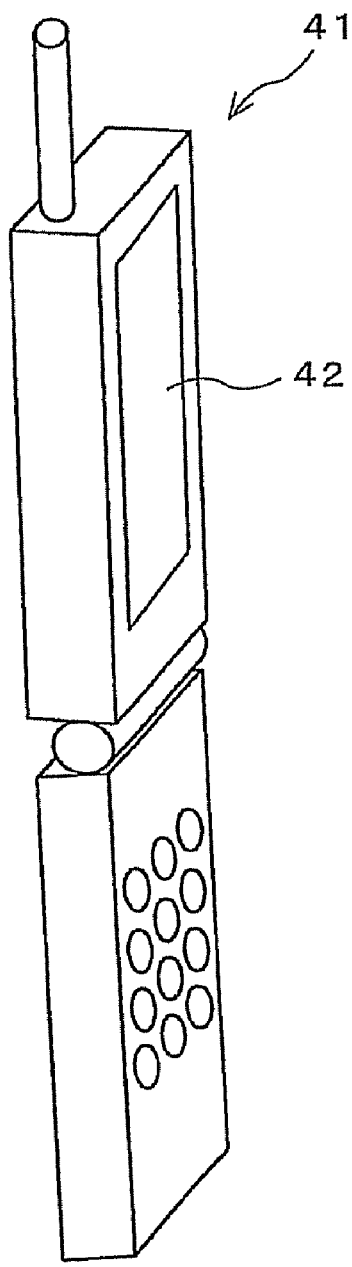
FIG. 15 is a perspective view showing a mobile telephone as a portable device according to the present embodiment.

A portable device according to the present embodiment will now be described. FIG. 15 is a perspective view showing a mobile telephone as the portable device according to the present embodiment. As shown in FIG. 15, a liquid crystal display apparatus 42 according to the present embodiment is installed in a mobile telephone 41 according to the present embodiment. The liquid crystal display apparatus 42 has the above-described structure.

The effect of the present embodiment will be discussed below. According to the present embodiment, one display pixel 10 is provided with six sub pixels, the red left-eye sub pixel RL, the green left-eye sub pixel GL, the blue left-eye sub pixel BL, the red right-eye sub pixel RR, the green right-eye sub pixel GR and the blue right-eye sub pixel BR, so that a color stereoscopic image can also be displayed. The display pixels are the same both in displaying a stereoscopic image and displaying a two-dimensional image. Accordingly, the resolution does not drop when displaying a stereoscopic image as compared with the case of displaying a two-dimensional image. In addition, a two-dimensional image and a stereoscopic image can be displayed in mixture in one screen. In this case, the resolutions of both images are equal to each other too, so that an observer does not feel awkward.

As the ratio of the width a of each sub pixel in the vertical direction 11 to the width b of each sub pixel in the horizontal direction 12 is 2:3, the shape of the display pixels becomes a square. Therefore, the shape of the display pixels in stereoscopic image mode becomes a square. This achieves an excellent image visibility. The effect is great particularly when displaying character information as a stereoscopic image. This is because when the vertical or horizontal resolution drops, the vertical lines or horizontal lines as constituting elements of character information drop out, making it extremely difficult for the observer to recognize the character information. Making the vertical resolution equal to the horizontal resolution can therefore ensure particularly adequate stereoscopic display of character information.

As the band-like color filters 31 to 33 extending in the horizontal direction 12 are provided in the present embodiment, three sub pixels can be arranged in the vertical direction 11, and two sub pixels in the horizontal direction 12. Accordingly, the sub pixels arranged can be dispersed in the vertical direction and the horizontal direction to relax the density of the sub pixels in the horizontal direction, as compared with the case of laying out six sub pixels in the horizontal direction 12, thus making it possible to increase the aperture ratio and facilitate the fabrication of the liquid crystal panel.

Note that, in the present embodiment, the layout of three sub pixels per display pixel in the vertical direction 11 increases the number of gate lines to three times as large as the conventional number. As the red color filters extending in the vertical direction are provided and the sub pixels of the individual colors are arranged in the horizontal direction in the conventional color liquid crystal display apparatus, the number of the gate lines is the same as that of a monochromatic liquid crystal display apparatus. Therefore, the use of the gate line inversion drive method or the dot inversion drive method to drive the liquid crystal display apparatus of the present embodiment significantly increases power consumption and shortens the time of applying signal voltages per gate line, thereby causing the signal voltages held incorrectly. The use of the frame inversion drive method, on the other hand, may cause flickering.

According to the present embodiment, therefore, the polarity of data signals is inverted every three gate lines as discussed above. This scheme prevents occurrence of flickering and can ensure the time of applying signal voltages of 8.24 μs per gate line, making it possible to suppress an increase in power consumption and occurrence of the signals held incorrectly. When the conventional gate line inversion drive method is adapted to the liquid crystal panel with the same pixel structure as that of the present embodiment, one horizontal period becomes 11.6 μs. Given that the period for the common electrode potential VCOM to be stable is 10 is as in the present embodiment, the time of applying signal voltages per gate line becomes 1.6 μs, which is shorter than 8.24 μs in the present embodiment. Such a shortage of the applying voltages time makes it extremely difficult to reliably apply voltages to the liquid crystal cells.

As the polarity of data signals is inverted every three gate lines or every display pixel (one pixel), the luminance difference between frames in each hue is reduced, so that occurrence of flickering can be prevented surely. In other words, it is possible to suppress an increase in power consumption and occurrence of the signal voltages held incorrectly while preventing occurrence of flickering by inverting the polarity of data signals every two gate lines or every four gate lines, inverting the polarity every three gate lines can allow the polarity to be evenly assigned to the red sub pixel, green sub pixel and blue sub pixel, so that no luminance difference occurs between the display pixels and the luminance difference between frames in each hue decreases. This can reliably prevent occurrence of flickering and further improves the image quality.

In the present embodiment, an AC voltage is applied to the common electrode and the polarity of a data signal is changed by changing both the potential of the data signal and the potential of the common electrode. This can made a change in the potential of the data signal smaller than that in the case where with the potential of the common electrode fixed, only the potential of the data signal is changed. Consequently, the breakdown voltages of the individual electronic components of the liquid crystal display apparatus can be lowered, leading to cost reduction of the apparatus.

Although the foregoing description of the present embodiment has been given of an example where two (N=2) sub pixels are arranged horizontally in each display pixel and a right-eye image and a left-eye image which have a parallax to each other are displayed to give stereoscopic display, the present invention is not limited to this particular example and may be adapted to a liquid crystal display apparatus h displays different images with respect to two view points. In case of multi-view-point display to display two-dimensional different images as images at N view points, the shape of the display pixels can be made to a square shape. This can prevent the resolutions of two-dimensional images from being lowered, and can improve, particularly, the visibility of character display.

(Second Embodiment)

Figure 16:
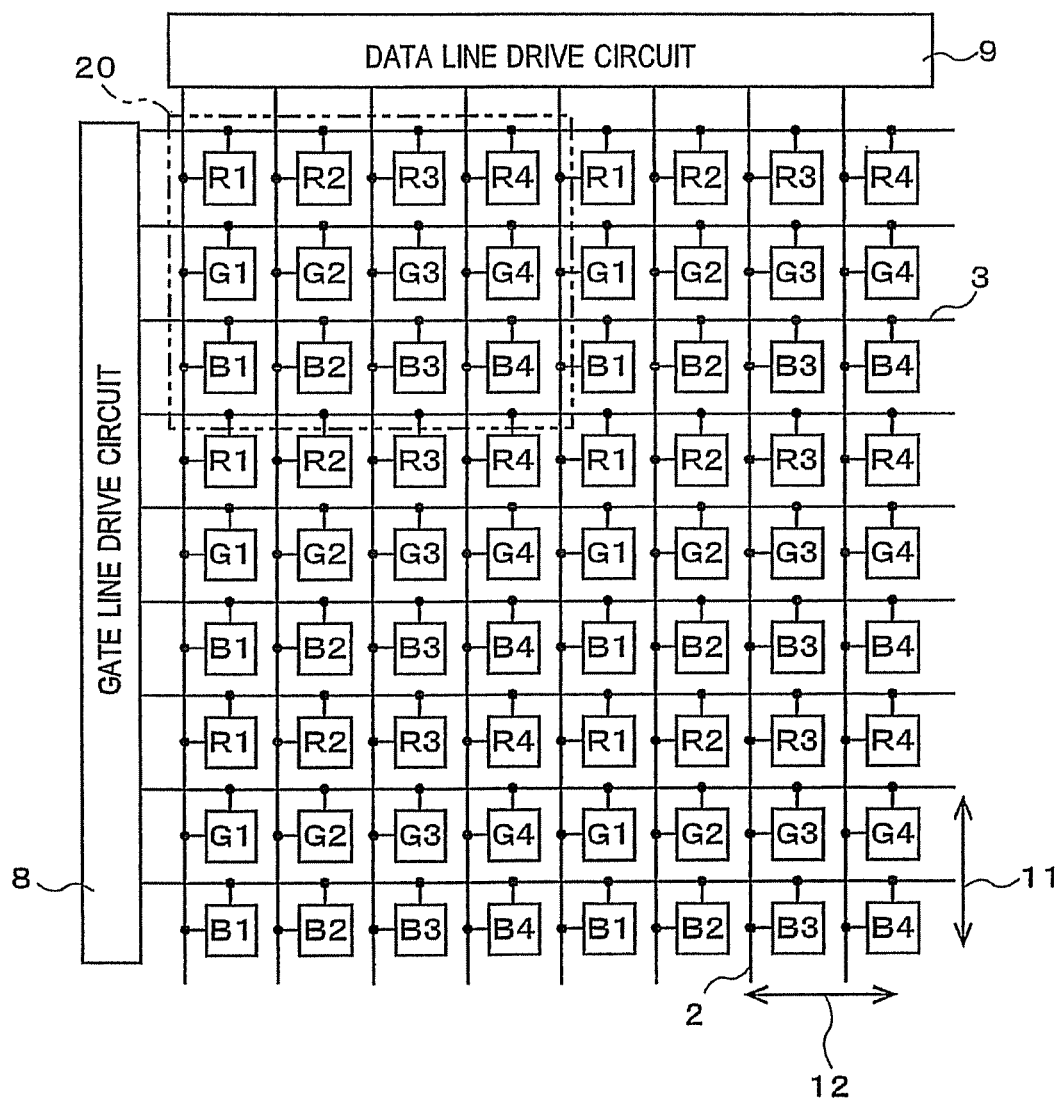
FIG. 16 is a block diagram of the liquid crystal panel of a liquid crystal display apparatus according to a second embodiment of the present invention.

Next, the second embodiment of the present invention will now be explained. FIG. 16 is a block diagram illustrating the liquid crystal display panel of a liquid crystal display device according to the present embodiment. As shown in FIG. 16, the present embodiment differs from the first embodiment in that each of the display pixels 20 comprises twelve sub pixels. That is, band-like color filters of red, green, and blue which extend in the horizontal direction 12 are repeatedly provided on the liquid crystal panel 1 in the vertical direction 11 in the order of red, green, and blue. The lenticular lens (not shown) is provided in front of the liquid crystal panel 1. A plurality of cylindrical lenses which constitute the lenticular lens extend in the vertical direction 11, and one cylindrical lens corresponds to four sub pixels which are consecutively provided in the horizontal direction 12 in one display pixel.

As a result, in each display pixel 20, the red sub pixels R1 to R4 are provided in the topmost row shown in FIG. 16 in this order from left to right in the diagram, the green sub pixels G1 to G4 are provided in the second row from the top in this order from left to right, and the blue sub pixels B1 to B4 are provided in the third row from the top, that is, the lowermost row, in this order from left to right. The sub pixels R1, G1, and B1 provided in a column in the vertical direction display an image for the first view point. Likewise, the sub pixels R2, G2, and B2 provided in a column in the vertical direction display an image for the second view point, the sub pixels R3, G3, and B3 display an image for the third view point, and the sub pixels R4, G4, and B4 display an image for the fourth view point.

In the general description of the above-described structure, one display pixel 20 comprises (4$k$+1)-th to (4$k$+4)-th sub pixels on the liquid crystal display panel 1 from the left in FIG. 16, and (3$n$+1)-th to (3$n$+3)-th sub pixels from the top where k is an integer ranging from 0 to 159. The twelve sub pixels constituting a single display pixel are arranged in a square area as seen from the front of the liquid crystal panel 1. Given that the layout pitch of the sub pixels in the vertical direction 11 is a, the layout pitch of the sub pixels in the horizontal direction 12 is b, the number of sub pixels provided in one display pixel 20 in the vertical direction 11 is M, and the number of sub pixels provided in one display pixel 20 in the horizontal direction 12 is N, a, b, M and N satisfy the equation 3. As M=3 and N=4 in the present embodiment, the equation 3 can be rewritten as the following equation 5. The other structure of the present embodiment is the same as the corresponding structure of the first embodiment.

$$a:b=4:3 \qquad \text{(Equation 5)}$$

Next, the operation of the liquid crystal display device according to the present embodiment structured as described above, i.e., the drive method for the liquid crystal display device according to the present embodiment will now be explained. In the present embodiment, in displaying different images to the first to fourth view points, the image for the first view point is displayed on a first group of the sub pixels R1, G1, the image for the second view point is displayed on a second group of the sub pixels R2, G2, and B2, the image for the third view point is displayed on a third group of the sub pixels R3, G3, and 33, and the image for the fourth view point is displayed on a fourth group of the sub pixels R4, G4, and B4. The multi-view-point display can be carried out this way. In displaying the same image to the first to fourth view points, the same image is mutually displayed on the first to fourth groups. That is, the sub pixels R1 to R4 are driven by the same signal, the sub pixels G1 to G4 are driven by the same signal, and the sub pixels B1 to B4 are driven by the same signal. The other operation of the present embodiment than the one described above is same as the corresponding operation of the first embodiment. That is, the polarity of the data signal is inverted every three horizontal periods and frame by frame.

Next, the effect of the present embodiment will now be explained. In the present embodiment, as the twelve sub pixels of the red sub pixels R1 to R4, the green sub pixels G1 to G4, and the blue sub pixels B1 to B4 are provided on in one display pixel 20, color images can be displayed to the four view points. The resolutions of the images do not change even if different images are displayed to the four view points, or the same image is displayed. Accordingly, different images and the same image can be mixed in one screen, and the mixture does not cause an awkward feeling. As the shape of each display pixel is a square shape, the visibility of the image is excellent, and, in particular, the visibility of character information is excellent. The other effect in the present embodiment than described above is the same as that of the first embodiment.

In the present embodiment, mutually unrelated images may be displayed to the four view points when different images are displayed to the four view points, an image for the right eye and an image for the left eye having a parallax to each other may be displayed to two of the four view points, so that a stereoscopic image can be displayed, or two sets of stereoscopic images may be displayed separately, one for two of the four view points and the other for the other two view points.

(Third Embodiment)

Figure 17:
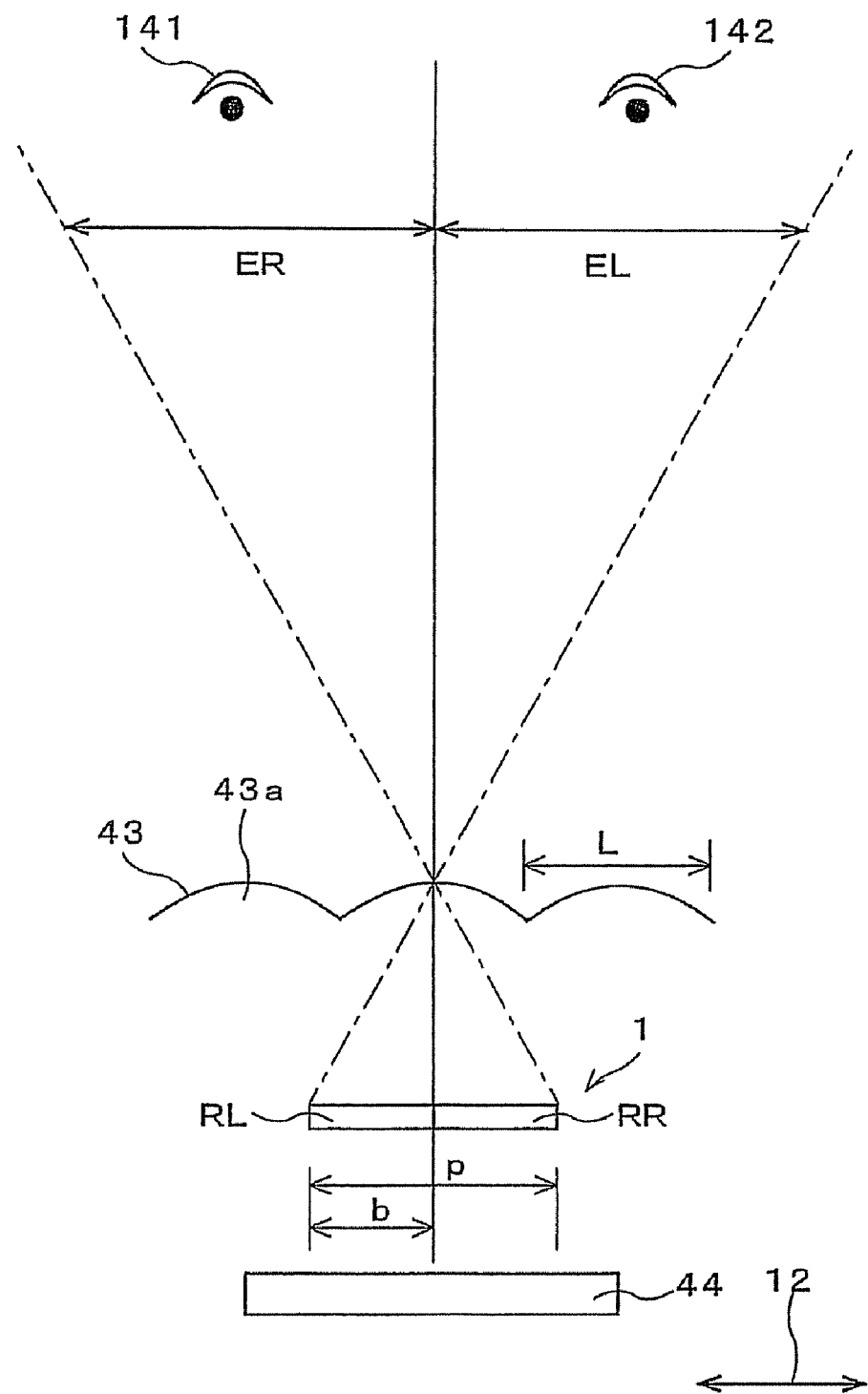
FIG. 17 is a diagram of an optical model illustrating a liquid crystal display apparatus according to a third embodiment of the present invention.
Figure 18:
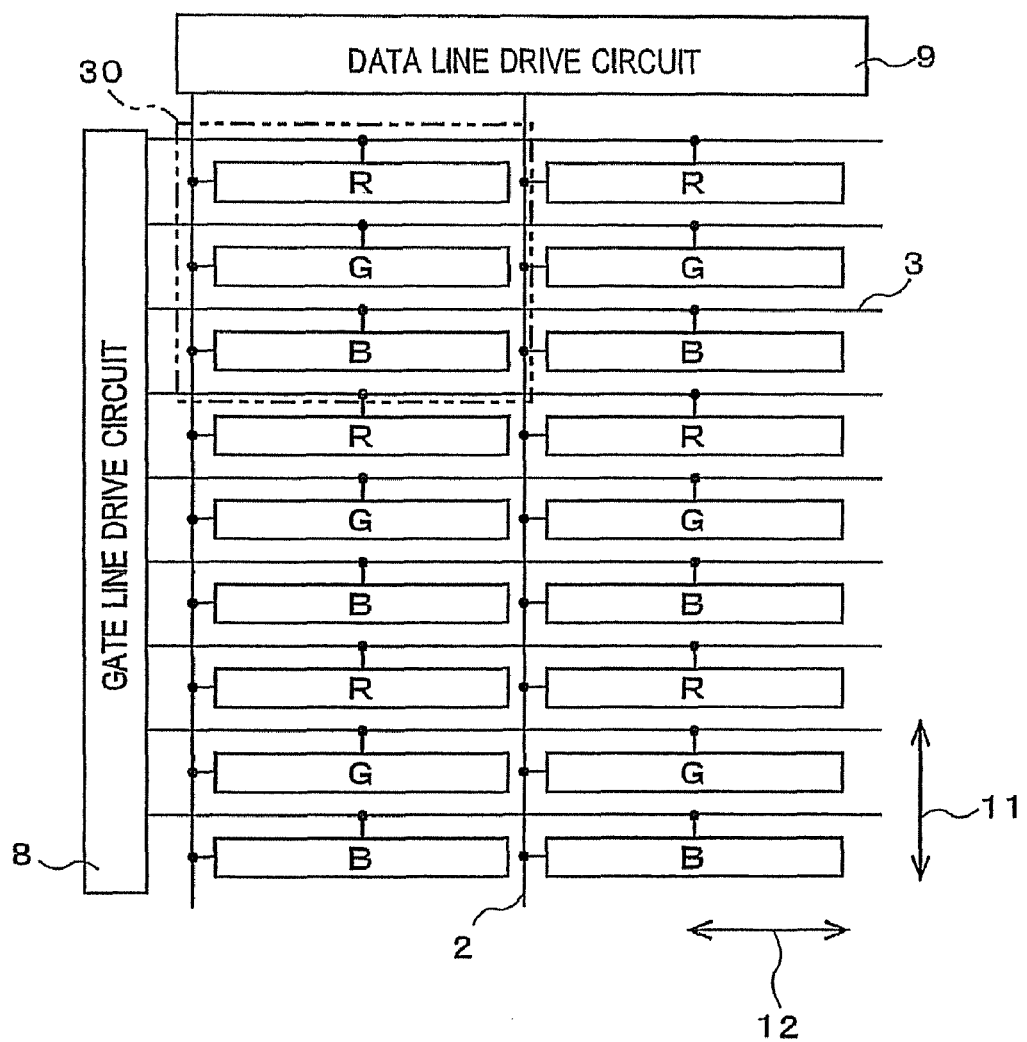
FIG. 18 is a block diagram of the liquid crystal panel of a liquid crystal display apparatus according to a reference example.

Next, the third embodiment of the present invention will now be explained. FIG. 17 is a diagram of an optical model showing a liquid crystal display device according to the present embodiment. The present embodiment differs from the first embodiment in that the layout pitch of the display pixels in the liquid panel is different from that of the cylindrical lenses in the lenticular lens. That is, a plurality of display pixels are arranged in a matrix form on the liquid crystal panel, each display pixel is provided with six sub pixels, two display pixels arranged in the horizontal direction and three display pixels arranged in the vertical direction, as per the first embodiment. A backlight 44 is provided at the back of the liquid crystal panel 1.

As shown in FIGS. 11 and 17, given that the number of the sub pixels arranged in the vertical direction 11 in each display pixel is M, the number of the sub pixels arranged in the horizontal direction 12 is N, the layout pitch of the sub pixels in the vertical direction 11 is a, the layout pitch of the sub pixels in the horizontal direction 12 is b, the layout pitch of the display pixels in the horizontal direction 12 is P, and the layout pitch of the cylindrical lenses in the horizontal direction 12 is L, the following equation 6 is satisfied. In the present embodiment, as N=2, and M=3, the equation 6 can be rewritten as the following equation 7. The other structure of the present embodiment than described above is same as the corresponding structure of the first embodiment.

$$(a \times M):(b \times N)=L:P \quad \text{(Equation 6)}$$

$$a:b=(L/3):(P/2) \quad \text{(Equation 7)}$$

In the present embodiment, the light rays output from the backlight 10 transmit left-eye sub pixels (for example, red left-eye sub pixels RL) and right-eye sub pixels (for example, red right-eye sub pixels RR), and the transmitted light rays are refracted by the cylindrical lenses 43a of the lenticular lens 43, and respectively reach the left eye 142 and the right eye 141 of the observer. At this time, if images with a mutual parallax are displayed on the left-eye sub pixels and the right-eye sub pixels, the observer can recognize a stereoscopic image. If the same image is displayed on both of the left-eye sub pixels and the right-eye sub pixels, the observer can recognize a two-dimensional image.

In the present embodiment, as the vertical length of the display pixels becomes (a×M) and the horizontal length becomes (b×N), their ratio (aspect ratio) meets the equation 6. When the observer views the liquid crystal panel 1 through the lenticular lens 43, the display pixels are observed as being magnified or demagnified by (L/P) times in the horizontal direction 12. Regarding the vertical direction 11, the display pixels are observed as in an equal magnification. Accordingly, the apparent aspect ratio of the display pixels when the observer views the liquid crystal panel 1 through the lenticular lens 43 becomes vertical:horizontal=(a×M):{(b×N)×(L/P)}=L:{P×(L/P)}=1:1, and the display pixels are seen as a square. Accordingly, the present embodiment can demonstrate the same effect as that of the first embodiment even if the layout pitch of the display pixels in the liquid crystal panel differs from that of the cylindrical lenses in the lenticular lens. The other operation and effect of the present embodiment are the same as those of the first embodiment.

Although the foregoing descriptions of the embodiments have been given of the case where the polarity of the data-signal potential to the common electrode potential is inverted every time three gate lines are scanned (i.e., every three horizontal periods) as the example, the present invention is not limited to the case, and the polarity may be inverted every time 2 to (2×M) gate lines are scanned, with the number of the sub pixels arranged in the vertical direction in each pixel being M. That is, in each of the above-described embodiments, because M=3, the polarity may be inverted every 2 to 6 horizontal periods.

The reason for the above will be explained below. When the polarities of the potentials of the data lines and the common electrode are inverted, it is necessary to ensure a sufficient time for the potentials of the data lines and the common electrode to become stable at the set values for the waveform at the rising time becomes dull due to the time constants of the data lines and the common electrode. As explained in the description of the first embodiment with specific numerals given as examples, when the total number of the gate lines is large, if the common-electrode voltage is inverted gate line by gate line by applying the gate line inversion drive method, the time for the common-electrode potential with respect to the time of applying signal voltages per gate line becomes long, shortening the time for applying the data signal to the pixels, which is likely to cause inadequate applying voltages. As a result, if the polarity is inverted for each gate line when the liquid crystal display apparatus is operated, the power consumption becomes large, and the time of applying voltages per gate line becomes shorter, which may cause incorrect voltages held. In the liquid crystal display device of the present invention, therefore, it is necessary to scan at least two gate lines until the polarity of the data signal is inverted.

In contrast, if the polarity is inverted every time more than (2×M) gate lines are scanned, the width (vertical length) of a region comprised of the sub pixels with the same polarity becomes large, and the degree of the spatial mixture of the regions with different polarities becomes small, so that the observer recognizes the regions as a horizontal stripe pattern. Accordingly, it is necessary that the width of the region comprised of the sub pixels with the same polarity is to be less than or equal to a region corresponding to (2×M) gate lines. Therefore, in the present invention, the polarity is inverted every time 2 to (2×M) gate lines are scanned.

As explained in the foregoing description of the first embodiment, when the polarity is inverted every M to (2×M) gate lines are scanned, the inversion pitch of the polarity and the layout pitch of the display pixels can be matched with each other, thus making it possible to prevent occurrence of flickering particularly effectively, and to improve the display quality particularly.

Although the foregoing descriptions of the embodiments have been given of the case where the lenticular lens is used as the optical member, the present invention is not limited to this case, and may use, for example, a parallax barrier. The parallax barrier may be provided in front of the liquid crystal panel, or at the back thereof, i.e., between the liquid crystal panel and the backlight.

Although the foregoing descriptions of the embodiments have been given of the case of using the transparent liquid crystal display, the present invention may use a reflection type liquid crystal panel. In using the reflection type liquid crystal panel, the optical member like the lenticular lens is provided in front of the liquid crystal panel, a transparent substrate is used as the front substrate of the liquid crystal panel, and the reflection layer is provided between the liquid crystal layer and the back substrate. Accordingly, the incoming light from the front transmits the front substrate and the liquid crystal layer, and is reflected at the reflection layer, and transmits the liquid crystal layer and the front substrate again, allowing an image to be added. The light is then directed to a plurality of view points by the optical member. Note that, in the reflection-type liquid crystal layer, the back substrate should not necessarily be transparent. In this case, the visibility can be enhanced by allowing the display pixels to be arranged in a square area, and the occurrence of flickering and an increase in power consumption can be suppressed by switching the polarity of the data signal every time 2 to (2×M) gate lines are scanned, as per the embodiments.

Although the foregoing descriptions of the embodiments have been given of the liquid crystal display device for two view points or four view points as an example, the present invention is not limited to this case, and can be applied to a liquid crystal display device for N view points (N being an integer greater than or equal to 2).

Although the foregoing descriptions of the embodiments have been given of the case where three sub pixels are arranged in the vertical direction (that is, M=3) in each display pixel to be the red, green and blue sub pixels, the present invention is not limited to this case, and the sub pixels of two colors or of four or more colors may be provided in each display pixel.

Although the foregoing descriptions of the embodiments have been given of the case where a TFT is used as a switching element, the present invention is not limited to this case, and a switching element other than the TFT may be used. In this case, the gate lines serve as the lines which transmit a switching signal for switching the switching element on and off.

Although a mobile telephone is illustrated as a portable device, the present invention is not limited to this case, and the liquid crystal display device of the first embodiment may be installed into a mobile terminal, a PDA, a game machine, a digital camera or a digital video. The liquid crystal display device of the second or third embodiment may be installed into those portable devices. The liquid crystal display device of the present invention may be used as a dedicated monitor for a personal computer or the like. In this case, the image processing circuit 19 shown in FIG. 9 may be provided in the personal computer.

What is claimed is:

1. A liquid crystal display apparatus comprising:
   a pixel circuit substrate, said pixel circuit substrate comprising:
      a first substrate;
      gate lines provided on said first substrate and extending in a first direction;
      data lines provided on said first substrate and extending in a second direction intersecting said first direction;
      pixel electrodes respectively provided at closest points of said gate lines and said data lines, each of said pixel electrodes constituting a sub pixel, (M×N) (N and M being an integer equal to or greater than 2, respectively) sub pixels constituting a display pixel in which N sub pixels are provided consecutively in said first direction and M sub pixels are provided consecutively in said second direction;
      switch elements, respectively provided at said closest points, which select whether or not to connect said data lines to said pixel electrodes based on potentials of said gate lines; and
      a drive circuit which applies gate-line drive signals to said gate lines in order, said gate-line drive signal enabling said switch element connected to said gate line to turn on, and which outputs data signals to said data lines, said drive circuit changing a polarity of a potential of said data signal with respect to a potential of said common electrode every time said gate-line drive signals are applied to 2 to (2×M) gate lines among said gate lines, and changing said polarity frame by frame;
   an opposing substrate provided in parallel to and apart from said pixel circuit substrate, said opposing substrate comprising:
      a second substrate; and
      a common electrode provided on said second substrate;
   a liquid crystal layer provided between said pixel circuit substrate and said opposing substrate; and
   a lenticular lens which has a plurality of cylindrical lenses provided in said first direction and directs light having passed through said liquid crystal layer to different directions, said cylindrical lenses being provided in association with columns of said display pixels aligned in said second direction, given that a layout pitch of said display pixels in said first direction is P, a layout pitch of said cylindrical lenses is L, a layout pitch of said sub pixels in said first direction is b, and a layout pitch of said sub pixels in said second direction is a, (a×M):(b×N)= L:P being satisfied,
   wherein the layout pitch P and the layout pitch L are different from each other.

2. The liquid crystal display apparatus according to claim 1, further comprising stripe-like color filters of M colors extending in said first direction and respectively intervening in paths of light rays which pass through each of said M sub pixels arranged in said second direction.

3. The liquid crystal display apparatus according to claim 1, wherein in each of said display pixels, one of said N sub pixels arranged in said first direction forms an image for a left eye, and another sub pixel forms an image for a right eye, thereby displaying a stereoscopic image.

4. The liquid crystal display apparatus according to claim 1, wherein said drive circuit changes said polarity of said data signal with respect to said common electrode every time said drive circuit applies said gate-line drive signal to M gate lines in said gate lines.

5. The liquid crystal display apparatus according to claim 1, wherein changing of said polarity of said data signal with respect to said common electrode is carried out by changing both a potential of said data signal and a potential to be applied to said common electrode.

6. A portable device comprising said liquid crystal display apparatus according to claim 1.

7. A drive method for a liquid crystal display apparatus which has a plurality of display pixels consisted of (M×N) (N and M being an integer equal to or greater than 2, respectively) sub pixels so that said N sub pixels are arranged consecutively in a first direction along which gate lines extend and said M sub pixels are arranged consecutively in a second direction along which data lines extend, each of said sub pixels being provided for each of pixel electrodes, and which has a lenticular lens consisted of a plurality of cylindrical lenses provided in association with columns of said display pixels aligned in said second direction, given that a layout pitch of said display pixels in said first direction is P, a layout pitch of said cylindrical lenses is L, a layout pitch of said sub pixels in said first direction is b, and a layout pitch of said sub pixels in said second direction is a, (a×M):(b×N)= L:P being satisfied, wherein said layout pitch P and said layout pitch L are different from each other, said method comprising:
   applying gate-line drive signals to said gate lines in order, said gate-line drive signal enabling a switch element connected to said gate line to turn on, outputting data signals to said data lines, and changing a polarity of a potential of said pixel electrodes with respect to a potential of said common electrode every time said gate-line drive signals are applied to 2 to (2×M) gate lines among said gate lines, in a first frame for displaying one image on said liquid crystal display apparatus; and
   applying gate-line drive signals to said gate lines in order, said gate-line drive signal enabling said switch element connected to said gate line to turn on, outputting data signals to said data lines, and changing a polarity of a potential of said pixel electrodes with respect to a potential of said common electrode every time said gate-line drive signals are applied to 2 to (2×M) gate lines among said gate lines, in a second frame for displaying another image with respect to said first frame by inverting said polarity.

8. The drive method for a liquid crystal display apparatus according to claim 7, wherein in each of said display pixels, one of said N sub pixels arranged in said first direction forms an image for a left eye, and another sub pixel forms an image for a right eye, thereby displaying a stereoscopic image.

9. The drive method for a liquid crystal display apparatus according to claim 7, wherein said polarity of said data signal with respect to said common electrode is changed every time said gate-line drive signals are applied to M gate lines in said gate lines.

10. The drive method for a liquid crystal display apparatus according to claim 7, wherein changing of said polarity of said data signal with respect to said common electrode is carried out by changing both a potential of said data signal and a potential to be applied to said common electrode.

11. The liquid crystal display apparatus according to claim 1, wherein each of a plurality of said display pixels is overlaid by more than one cylindrical lens.

12. The drive method for a liquid crystal display apparatus according to claim 7, wherein each of a plurality of said display pixels is overlaid by more than one cylindrical lens.

* * * * *